(12) United States Patent
Baylon et al.

(10) Patent No.: US 11,659,183 B2
(45) Date of Patent: *May 23, 2023

(54) SYSTEM AND METHOD FOR RESHAPING AND ADAPTATION OF HIGH DYNAMIC RANGE VIDEO DATA

(71) Applicant: ARRIS Enterprises LLC, Suwanee, GA (US)

(72) Inventors: David M. Baylon, San Diego, CA (US); Zhouye Gu, San Diego, CA (US); Ajay Luthra, San Diego, CA (US); Koohyar Minoo, San Diego, CA (US); Yue Yu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/347,210

(22) Filed: Jun. 14, 2021

(65) Prior Publication Data
US 2021/0314570 A1    Oct. 7, 2021

Related U.S. Application Data

(63) Continuation of application No. 16/880,746, filed on May 21, 2020, now Pat. No. 11,070,809, which is a
(Continued)

(51) Int. Cl.
*H04N 19/124* (2014.01)
*H04N 19/186* (2014.01)
(Continued)

(52) U.S. Cl.
CPC .......... *H04N 19/124* (2014.11); *G06T 5/007* (2013.01); *H04N 19/174* (2014.11);
(Continued)

(58) Field of Classification Search
CPC ...... H04N 19/186; H04N 19/30; H04N 19/70; H04N 19/117; H04N 19/136; H04N 19/17;
(Continued)

(56) References Cited

U.S. PATENT DOCUMENTS 9,288,489 B2    3/2016    Mertens
2015/0131904 A1    5/2015    Hattori et al.
(Continued)

FOREIGN PATENT DOCUMENTS

KR    20150024846 A    3/2015
KR    20150024846 A    9/2020
(Continued)

OTHER PUBLICATIONS

Recommendation ITU-T H.265 | International Standard ISO/IEC 23008-2, HEVC version 2, Oct. 2014.
(Continued)

*Primary Examiner* — Masum Billah
(74) *Attorney, Agent, or Firm* — Chernoff, Vilhauer, McClung & Stenzel, LLP

(57) ABSTRACT

A system and method for regenerating high dynamic range (HDR) video data from encoded video data, extracts, from the encoded video data, a self-referential metadata structure specifying a video data reshaping transfer function. The video data reshaping transfer function is regenerated using data from the metadata structure and the extracted reshaping transfer function is used to generate the HDR video data by applying decoded video data values to the reshaping transfer function.

21 Claims, 4 Drawing Sheets

Related U.S. Application Data continuation of application No. 15/274,442, filed on Sep. 23, 2016, now Pat. No. 10,674,150.

(60) Provisional application No. 62/242,272, filed on Oct. 15, 2015, provisional application No. 62/241,087, filed on Oct. 13, 2015, provisional application No. 62/241,094, filed on Oct. 13, 2015, provisional application No. 62/222,723, filed on Sep. 23, 2015.

(51) Int. Cl.
| | | |
|---|---|---|
| *H04N 19/44* | (2014.01) | |
| *G06T 5/00* | (2006.01) | |
| *H04N 19/98* | (2014.01) | |
| *H04N 19/70* | (2014.01) | |
| *H04N 19/174* | (2014.01) | |
| *H04N 19/177* | (2014.01) | |

(52) U.S. Cl.
CPC ......... *H04N 19/177* (2014.11); *H04N 19/186* (2014.11); *H04N 19/44* (2014.11); *H04N 19/70* (2014.11); *H04N 19/98* (2014.11); *G06T 2207/20208* (2013.01)

(58) Field of Classification Search
CPC ...... H04N 19/176; H04N 19/36; H04N 19/46; H04N 19/85; H04N 19/172; H04N 19/174; H04N 19/182; H04N 19/184; H04N 19/187; H04N 19/188; H04N 19/192; H04N 19/44; H04N 19/467; H04N 19/50
USPC ........................................................ 375/240
See application file for complete search history.

(56) References Cited

U.S. PATENT DOCUMENTS

| | | |
|---|---|---|
| 2016/0005349 A1 | 1/2016 | Atkins et al. |
| 2016/0134872 A1 * | 5/2016 | Su ........................ H04N 19/192 |
| | | 375/240.03 |
| 2017/0085880 A1 | 3/2017 | Minoo et al. |

FOREIGN PATENT DOCUMENTS

| | | | |
|---|---|---|---|
| WO | 2014204865 A1 | 12/2014 | |
| WO | 2017019818 A1 | 2/2017 | |
| WO | WO-2017019818 A1 * | 2/2017 | ........... H04N 19/117 |
| WO | 2017053432 A1 | 3/2017 | |
| WO | WO-2017053432 A1 * | 3/2017 | ............. G06T 5/009 |

OTHER PUBLICATIONS

PCT Search Report & Written Opinion, RE: Application No. PCT/US2016/053511, dated Jan. 5, 2017.
M. Winken, et al., "CE2: SVC bit-depth scalability", 24th JVT Meeting, 81st MPEG Meeting; Jun. 29-Jul. 5, 2007, Geneva (Joint Video Team of ISO/IEC JTC1/SC29/WG11 and ITU-T SG.16), No. JVT-X057, Jul. 4, 2007, pp. 1-11.
Q. Chen, et al., "Near constant-time optimal piecewise LDR to HDR inverse tone mapping", Optomechatronic Micro/Nano Devices and Components III, Oct. 8-10, 2007, Lausanne, Switzerland, (Proceedings of SPIEE, ISSN 0277-786X), vol. 9404, Feb. 27, 2015, pp. 1-2.
A. Luthra, et al., "New draft CfE for HDR and WCG Video Coding", 111th MPEG Meeting, Feb. 6-20, 2015, Geneva (Motion Picture Expert Group or ISO/IEC JTC1/SC29/WG11) No. m36131, Feb. 20, 2015.
K. Minoo, et al., "Description of the reshaper parameters derivation process in ETM reference software", 23rd JCT-VC Meeting, Feb. 19-26, 2016, San Diego (Joint Video Team of ISO/IEC JTC1/SC29/WG11 and ITU-T SG.16), No. JCTVC-W0031, Jan. 11, 2016, the whole document.
P. Andrivon, et al., "SEI message for Color Mapping Information," JCTVC-Q0074-r3, p. 1-14, Joint Collaborative Team on Video Coding (JCT-VC) of ITU-T SG 16 WP 3 and ISO/IEC JTC 1/SC 29/WG 11, at the 17th Meeting, in Valencia, ES, on Apr. 2014.
Office Action in Korean Patent Application No. 10-2022-7014262, dated Jun. 10, 2022.

* cited by examiner

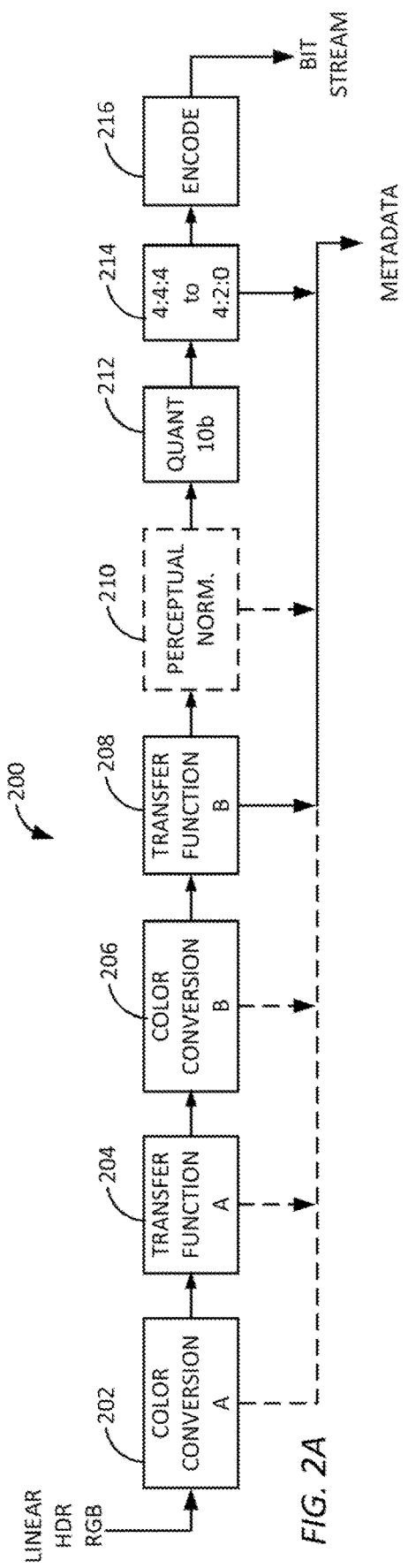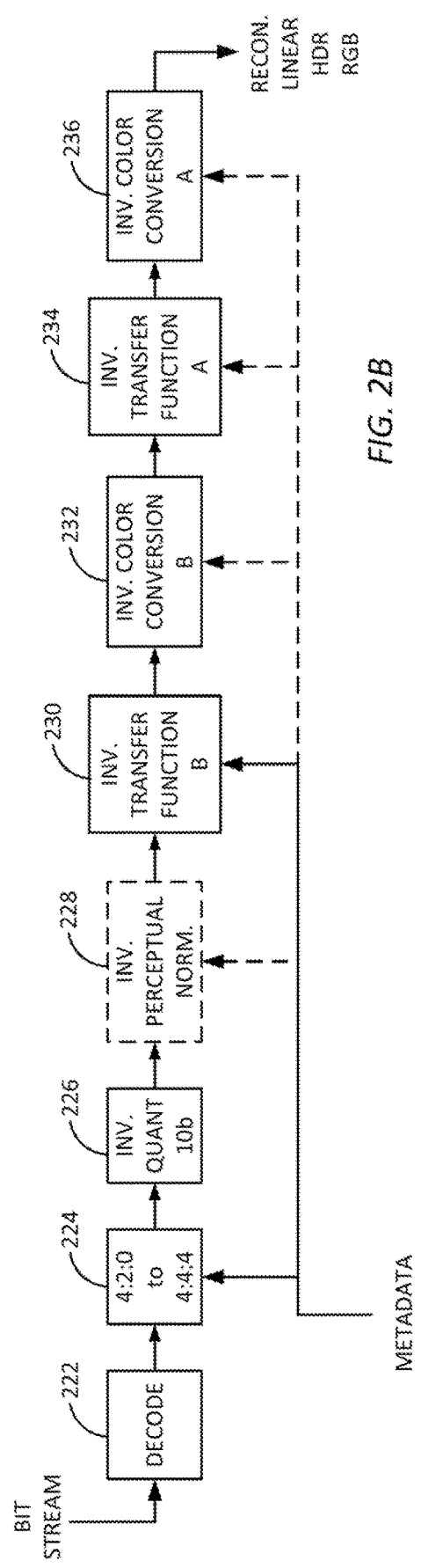

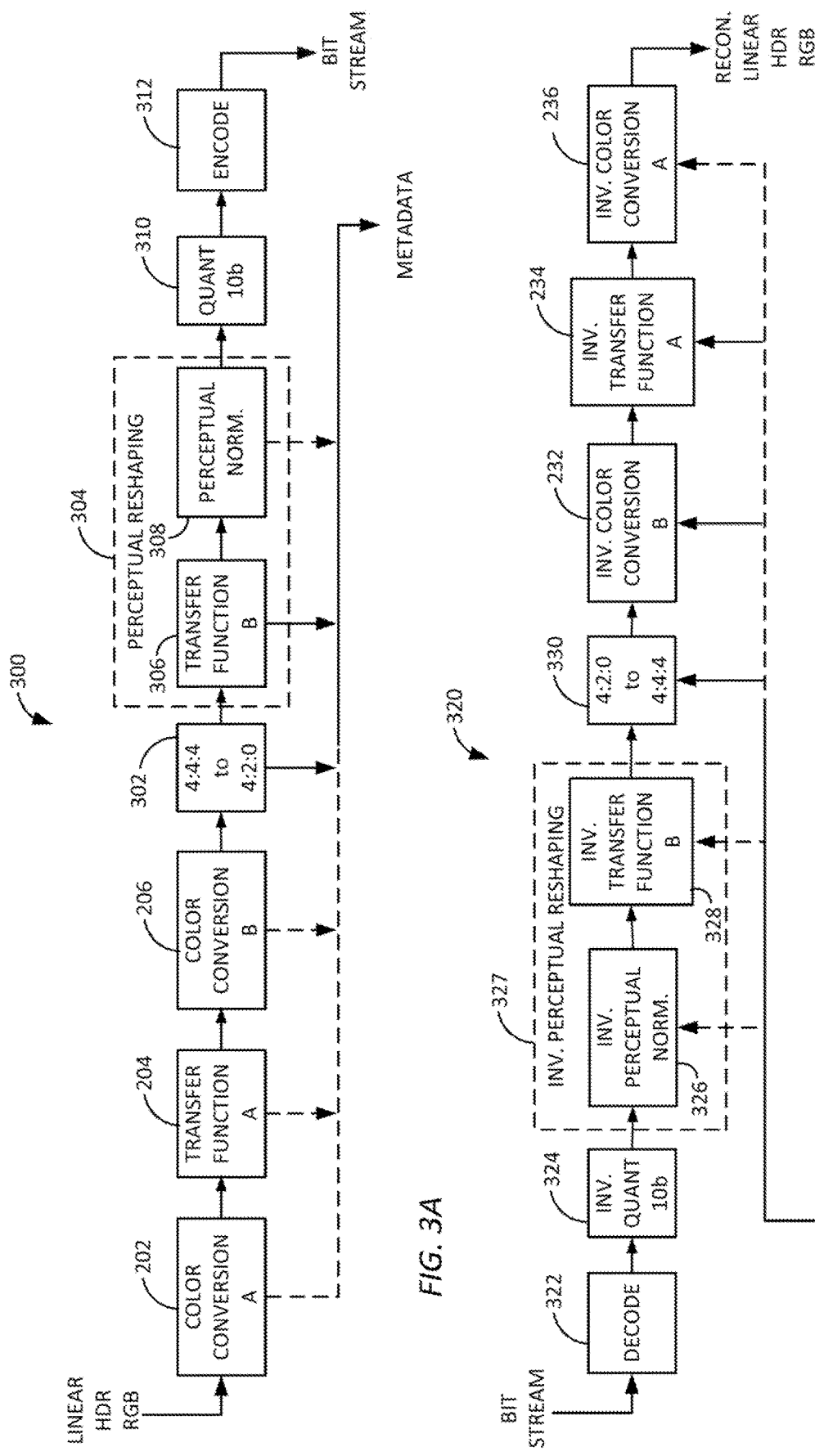

SYSTEM AND METHOD FOR RESHAPING AND ADAPTATION OF HIGH DYNAMIC RANGE VIDEO DATA

This application claims priority under 35 U.S.C. § 119(e) from earlier filed U.S. Provisional Application Ser. No. 62/222,723, filed Sep. 23, 2015, Ser. No. 62,241,087 filed Oct. 13, 2015, 62/241,094 filed Oct. 13, 2015, and Ser. No. 62/242,272 filed Oct. 15, 2015 which are hereby incorporated by reference.

TECHNICAL FIELD

The present disclosure relates to the field of video encoding and decoding High Dynamic Range (HDR) and/or Wide Color Gamut (WCG) video sequences, particularly a method for encoding such sequences and for storing and transmitting a transfer function used to recover HDR and/or WCG video sequences from a decoded video sequence.

BACKGROUND

HDR video and WCG video provide greater ranges of luminance and color values than traditional Standard Dynamic Range (SDR) video. For example, SDR video can have a limited luminance and color range, such that details in shadows or highlights can be lost when images are captured, encoded, and/or displayed. In contrast, HDR and/or WCG video can capture a broader range of luminance and color information, allowing the video to appear more natural and closer to real life to the human eye.

However, many common video encoding and decoding schemes, such as MPEG-4 Advanced Video Coding (AVC) and High Efficiency Video Coding (HEVC), are not designed to directly handle HDR or WCG video. As such, HDR and WCG video information is normally converted into other formats before it can be encoded using one of these video compression algorithms.

For example, HDR video formats such as the EXR file format describe colors in the linear light Red, Green, Blue (RGB) color space with 16-bit half-precision floating point values having 10 significant bits, 5 exponent bits and one sign bit. These values cover a broad range of potential intensity and color values. SDR video employs 8 or 10-bit integer values to express the colors of non-HDR and non WCG video. Many existing video compression algorithms are meant for use with SDR video and, thus, expect to receive 8 or 10-bit integer values. It may be difficult to quantize the 16-bit half-precision floating point color values into 10-bit integer values that the compression algorithms can work with without substantially reducing video dynamic range or introducing significant distortion.

Some encoders use a coding transfer function to convert linear values from the input video into non-linear values prior to uniform quantization. By way of a non-limiting example, a coding transfer function may include a gamma function that compresses luminance and/or color (chrominance) values at one or both ends of the quantization range so that a larger range may be represented by the 8 or 10 bit values provided to the encoder. The coding transfer function may be fixed, such that it does not change dependent on the content of the input video. For example, an encoder's coding transfer function can be defined to statically map every possible input value in an HDR range, such as from 0 to 10,000 nits (candelas per square meter or $cd/m^2$), to specific non-linear values ranging from 0 to 255 for 8-bit values or 0 to 1023 for 10 bit values. When the input video contains input values in only a portion of that range, however, fixed mapping can lead to poor allocation of quantization levels resulting in quantization distortion in the reproduced image. For example, a picture primarily showing a blue sky can have many similar shades of blue, but those blue shades can occupy a small section of the overall range for which the coding transfer function is defined. As such, similar blue shades may be quantized into the same value. This quantization may be perceived by viewers as contouring or banding, where quantized shades of blue extend in bands across the sky displayed on their screen instead of a more natural transitions between the shades.

Additionally, psychophysical studies of the human visual system have shown that a viewer's sensitivity to contrast levels at a particular location can be more dependent on the average brightness of surrounding locations than the actual levels at the location itself. Many coding transfer functions, however, do not take this into account and instead use fixed conversion functions or tables that do not take characteristics of the surrounding pixels, into account.

SUMMARY

A system and method for regenerating high dynamic range (HDR) video data from encoded video data, extracts, from the encoded video data, a self-referential metadata structure specifying a video data reshaping transfer function. The video data reshaping transfer function is regenerated using data from the metadata structure and the extracted reshaping transfer function is used to generate the HDR video data by applying decoded video data values to the reshaping transfer function.

BRIEF DESCRIPTION OF THE DRAWINGS

Further details of the present invention are explained with the help of the attached drawings in which:

FIGS. 2A and 2B depict a first example of a process for encoding an input HDR and/or WCG video sequence into a coded data raw byte sequence payload (RBSP) compatible with a non-HDR, non-WCG video encoder using up to two color volume conversion processes and two transfer functions, and decoding that coded RBSP into a decoded video with a complementary video decoder that uses inverse color volume conversion processes and transfer functions.

FIGS. 3A and 3B depict a second example of a process for encoding and decoding an input HDR and/or WCG video sequence using a non-HDR, non-WCG video encoder and decoder where a reshaping transfer function used by the encoder is combined with a perceptual normalization operation and the inverse reshaping transfer function used by the decoder is combined with an inverse perceptual normalization process.

DETAILED DESCRIPTION

The example systems and methods described below adapt the reshaping transfer function, or otherwise convert and/or redistribute HDR and/or WCG video data to effectively compress the HDR and/or WCG video so that it may be quantized and encoded by a non-HDR, non-WCG encoder such as an H.265 HEVC (High Efficiency Video Coding), H.264/MPEG-4 AVC (Advanced Video Coding), or MPEG-2 encoder and then reconstituted to recover at least some of the HDR and/or WCG data at the receiver. The transfer functions may be based on the actual video content at the level of a group of pictures, a picture, or a sub-picture window of the input video. These video processes may be achieved by generating non-linear equations or tone maps that compress the color and/or intensity information actually present in temporal and/or spatial segments of the input video data instead of across a full range of potential values. As such, when the non-linear values are uniformly quantized, the noise and/or distortion introduced by uniform quantization can be minimized such that it is unlikely to be perceived by a human viewer. In addition, metadata information about the reshaping transfer function used to compress and encode the input video data is efficiently inserted into a self-referential metadata structure that is transmitted to decoders. The decoders recover this transfer function as a look-up table (LUT) to perform corresponding inverse operations when decoding the video data.

Figure 1:
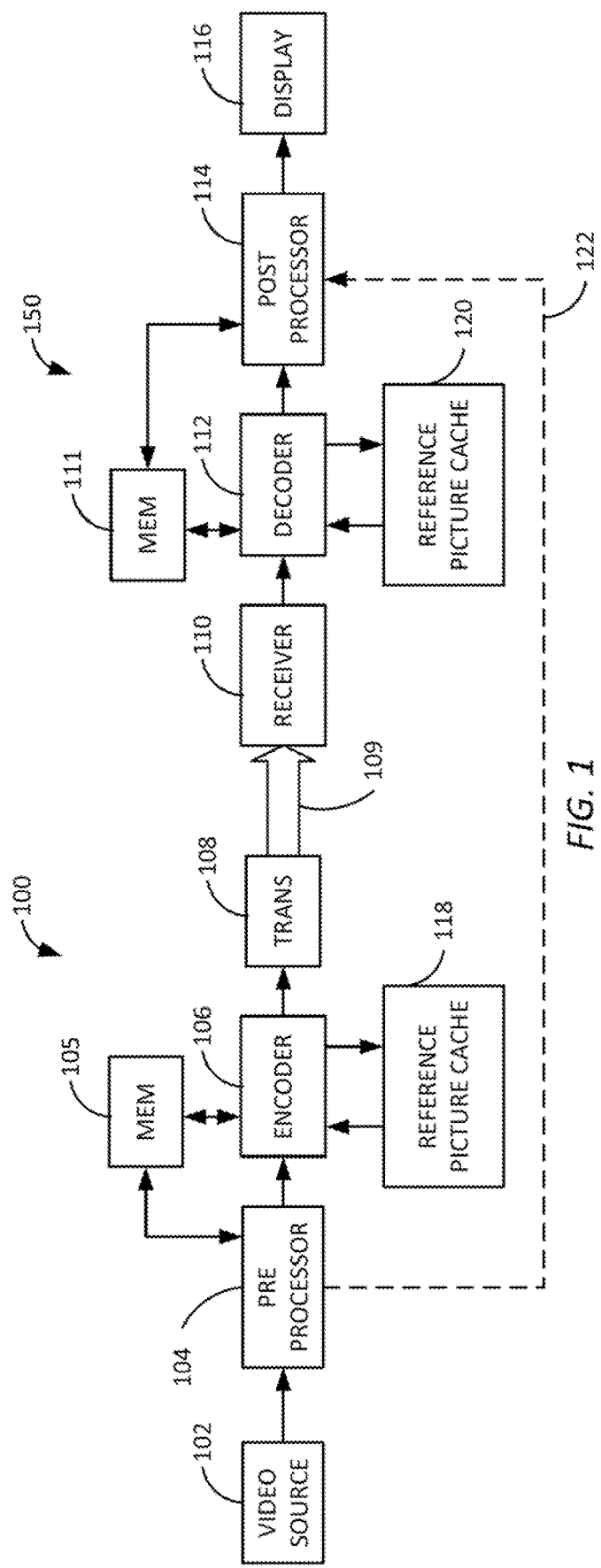
FIG. 1 depicts an embodiment of a video coding system comprising an encoding system and a decoding system.

FIG. 1 depicts an embodiment of a video coding system comprising an encoder system 100 and a decoder system 150. The encoder 100 system can comprise processors, (including digital signal processors (DSPs), or specialized video processors) memory, circuits, and/or other hardware and software elements configured to encode, transcode, and/or compress input video a coded data stream 109. The encoder system 100 can, for example, be configured to generate the coded data stream 109 according to a video coding format and/or compression scheme. The encoder system, for example, may generate a raw byte sequence payload (RBSP) as defined in the H.265 HEVC (High Efficiency Video Coding) standard, or an encoded bit-stream as defined in the H.264/MPEG-4 AVC (Advanced Video Coding), or MPEG-2 standards.

The example encoder system 100 receives HDR and/or WCG video data from a video source 102. The system 100 includes a preprocessor 104 that adaptively processes the HDR and/or WCG data so that it may be encoded using an encoder 106 and a memory 105. The encoder 106 may be a Main 10 HEVC encoder that encodes video data using reference pictures in a reference picture cache 118. The encoded video data may be stored in the memory 105 which may also store data used by the decoder 106, for example look-up tables that implement transfer functions and/or tone maps that are used by the preprocessor 104. Although the preprocessor 104 and decoder 106 are shown as using a shared memory 105, it is contemplated that they may use separate memories. The encoded data may be transmitted using the transmitter 108 as a bit stream 109 to a receiver 110 of the decoder system 150. The transmitter and receiver may use any transmission method including wired, wireless or optical connections. In one embodiment, the transmitter may format the encoded video data as Internet protocol (IP) packets and transmit the IP packets to the receiver 110 over a network. The network may be a digital cable television connection using Quadrature Amplitude Modulation (QAM), or other digital transmission mechanism. The network may be a wired cable network, an optical fiber network, or a wireless network. The network may be a private network or a global information network (e.g. the Internet®). In addition to transmitting the encoded video data, the transmitter 100 transmits metadata 122 describing the processing performed by the preprocessor 104. Although the metadata 122 is shown as a separate signal, it may be included in the data stream 109, for example, as supplemental enhancement information (SEI) or video usability information (VUI) messages in the data stream or in the headers of image essences, image sequences, Groups of Picture (GOP), Pictures, Slices, or other sub-picture elements. The SEI or VUI messages may identify a rectangular processing windows defined by x and y coordinates of the input image data and particular metadata defining the processing performed by the encoder on the identified processing window. The metadata uses part of the bandwidth of the transmitted data stream. It is desirable, therefore, to reduce the amount of metadata that is sent from the encoder system 100 to the decoder system 150.

The decoder system 150 can comprise processors, memory, circuits, and/or other hardware and software elements configured to receive the data stream 109 at receiver 110 and to decode, transcode, and/or decompress the coded data stream 109 into decoded HDR and/or WCG video for presentation on the display 116. The decoder system 150 can be configured to decode the coded data stream 109 according to a video coding format and/or compression scheme, such as H.265 HEVC, H.264/MPEG-4 AVC, or MPEG-2. By way of a non-limiting example, in some embodiments the decoder 112 can be a Main 10 HEVC decoder that uses reference images stored in the reference picture cache 120. The decoder 112 is coupled to a memory 111 that holds the coded bit stream and may also hold data used by the decoder such as look-up tables implementing inverse transfer functions and/or tone maps that are used by the post processor 114. Although the decoder 112 and post processor 114 are shown as using a shared memory 111, it is contemplated that they may use separate memories. After the video data is decoded, it is processed by a post-processor 114 that, responsive to the metadata received from the encoder, inverts the processing performed by the preprocessor 104 to regenerate the HDR and/or WCG video data. The decoded HDR and/or WCG video data can be output to a display device for playback, such as playback on a television, monitor, or other display 116.

In some embodiments, the encoder system 100 and/or decoder system 150 can be a dedicated hardware device. In other embodiments the encoder system 100 and/or decoder system 150 can be, or use, software programs running on other hardware such as servers, computers, or video processing devices. By way of a non-limiting example, an encoder system 100 can be a video encoder operated by a video service provider, while the decoder system 150 can be part of a set top box, such as a cable box, connected to a consumer television display.

The input video data provided by the video source 102 can comprise a sequence of image frames, a group of pictures (GOP) or an image essence. In the materials that follow, the terms "frame," "picture," and "image" are used interchangeably to indicate video data corresponding to a single displayed frame, image or picture. In some embodiments, colors in the pictures can be described digitally using one or more values according to a color space or color model. By way of a non-limiting example, colors in a picture can be indicated using an RGB color model in which the colors are described through a combination of values in a red channel, a green channel, and a blue channel or a luminance/chrominance model in which colors are defined by a luminance value Y and two chrominance values, for example, Cr and Cb.

The input video data can be HDR video having one or more frame sequences with luminance and/or chrominance values described in a high dynamic range (HDR) and/or on a wide color gamut (WCG). By way of a non-limiting example, a video with a high dynamic range can have luminance values indicated on a scale with a wider range of possible values than a non-HDR video, and a video using a wide color gamut can have its colors expressed on a color model with a wider range of possible values in at least some channels than a non-WCG video. As such, an HDR input video can have a broader range of luminance and/or chrominance values than standard or non-HDR videos.

In some embodiments, the HDR input video data can have its colors indicated with RGB values in a high bit depth format, relative to non-HDR formats that express color values using lower bit depths such as 8 or 10 bits per color channel. By way of a non-limiting example, the HDR input video data can be in an EXR file format with RGB color values expressed in a linear light RGB domain using a 16 bit floating point value for each color channel.

As shown in FIG. 2A, the encoder system 200 can apply, to the linear HDR RGB data, a first (intermediate) color conversion operation (color volume transform) 202, a first transfer function 204, a second (final) color conversion operation 206 a second (reshaping) transfer function 208, which may include an optional perceptual normalization operation 210 before quantizing the processed data to 10-bit values, down-sampling the chrominance information and encoding the resulting data using an existing encoder 216 such as a Main 10 HEVC encoder. The blocks 202, 204, 206, 208 and 210 implement a compression and perceptual mapping operation that converts the linear HDR RGB values from video source 202 onto values on a non-linear curve, based on one or more temporally and/or spatially localized characteristics of the video's content.

By way of nonlimiting examples, the perceptual mapping operation can be tailored to the content of the video data set, which may include all or a portion of the HDR/WCG video data, based on intended maximum or minimum sample values, minimum brightness, average brightness, peak brightness, maximum contrast ratio, a cumulative distribution function, quantization step size and/or any other factor in the data set. In some embodiments, such characteristics can be predetermined and specified for the data set. Alternatively, the characteristics can be found through a histogram or statistical analysis of color components or luminance components of the video at various stages of processing. In one example, the digital image data may be segmented into processing windows prior to applying the transfer functions or tone mapping operations. One or more component (e.g. Y'CbCr) of each processing window may be analyzed to determine, for example minimum sample value, maximum sample value, average sample value, value, and maximum contrast (e.g. the ratio of the maximum sample value to the minimum sample value). These values may be calculated for a single component or for combinations of two or more components. These values may be analyzed to determine the perceptual mapping (e.g. reshaping transfer function and perceptual normalization) to apply to the processing window.

The example perceptual mapping is configured to redistribute linear color information on a non-linear curve that is tailored to the content of the input video data on a global or local temporal or spatial range in order to allow the HDR video data to be more efficiently encoded using the encoder 216 so that it may be decoded and reconstructed as HDR video data in the decoding system 220 shown in FIG. 2B. As described below converting the linear color values to other color spaces and applying non-linear curves based on the content of the input video in a limited temporal or spatial range can provide HDR and/or WCG detail in the reconstructed image while reducing the risk of distortion and/or noise being introduced through uniform quantization operations. In some embodiments, a greater number of bits and/or quantization levels can be allocated to ranges of intensities and hues that are present in a portion of a video frame and/or that are most likely to be perceived by a human viewer, while fewer bits and/or quantization levels can be allocated to intensities and hues that are not present in the color channels and/or that are less likely to be perceived by viewers.

By way of a non-limiting example, when the input video data represents a scene in that takes place at night, its pictures can primarily include dark colors that are substantially bunched together in the RGB domain. In such a scene, lighter colors in the RGB domain can be absent or rare. In this situation the combined perceptual mapping can be adapted such that the chrominance and luminance values are redistributed on one or more non-linear curves that include the range of chrominance and luminance values actually present within the scene, while omitting or deemphasizing values that are not present within the scene. As such, formerly bunched-together dark chrominance and luminance values can be spread out substantially evenly on a curve of non-linear values (allocated a larger number of uniform quantization steps) while less common brighter values can be compressed together (allocated a smaller number of quantization steps) or even omitted if they are absent in the scene. As the dark values can be spread out on the curve, fine differences between them can be distinguished even when the values on the non-linear curve are uniformly quantized into discrete values or code words.

As described above, the perceptual mapping operation can be adaptive, such that it can change to apply different non-linear transfer functions depending on the content of the input video for a sequence of pictures, a single picture or a sub-picture window. Sub-picture processing allows different sub-areas of the same picture, such as processing windows, slices, macroblocks in AVC, or coding tree units (CTUs) in HEVC to be processed differently, based on their content. In other embodiments or situations, the perceptual mapping operations can be changed on a picture level for different pictures. In still other embodiments or situations, the perceptual mapping operation can be changed on a suprapicture level for different sequences of pictures, such as different Groups of Pictures (GOPs) or image essences. A perceptual mapping operation can be applied in any desired color space, such as the RGB, Y'CbCr, X'Y'Z' or I'PT color spaces. The content of video data representing a particular sequence of pictures, single picture or sub-picture element may be determined by generating a histogram of pixel values represented by the video data. For example, an image having both relatively dark and relatively bright areas may be segmented, for example, using a quad-tree algorithm, so that data from the dark areas are in one set of processing windows and data from the bright areas are in another set of windows. The perceptual mapping applied to the windows in the dark areas may be different than that applied in the bright areas, allowing detail in both areas to be maintained and displayed in the reproduced HDR image.

In one implementation, the perceptual normalization block 210 and/or the reshaping transfer function block 208 can apply a perceptual mapping transfer function to the Y'CbCr values provided by the color conversion block 206 to generate perceptually mapped Y'CbCr values. In some embodiments the perceptual mapping operation can use a 3D lookup table (LUT) or multiple 1D LUTs that map Y'CbCr values to associated perceptually mapped Y'CbCr values. In other embodiments, the perceptual mapping operation can use one or more formulas to convert each color component. By way of a non-limiting example, the perceptual mapping operation can convert values using formulas such as: Y'_PM=f(Y', Cb, Cr) Cb_PM=g(Y', Cb, Cr) Cr_PM=h(Y', Cb, Cr) In this example, the functions can each take the three Y'CbCr values as inputs and output a perceptually mapped Y'CbCr values.

When one or more LUTs or equations are used to implement the reshaping transfer function it may be desirable to send metadata defining a corresponding inverse reshaping transfer function from the encoding system 100 to the decoding system 150. Because different coding functions may be used for different groups of pictures, pictures or sub-picture processing windows, the encoding system 100 may send metadata describing each of the LUTs and/or equations to the decoding system 150. The materials below describe an efficient data structure (i.e. a metadata structure) and method for storing and sending this metadata so that the metadata consumes a relatively small amount of the total signal bandwidth between the encoding system 100 and decoding system 150.

As shown in FIG. 2A, the example encoder 200 performs the first color conversion operation 202 on the HDR/WCG linear RGB data set. This operation transforms the linear RGB values into an intermediate linear color space, for example, LMS, XYZ or YCbCr. This transformation reduces the redundancy in the RGB data and puts the data in a format that is more conducive to compression. It is contemplated, however, that, depending on the format of the input data, block 202 may not perform any color conversion or may perform different color conversion operations on different portions of a video sequence including different portions of a single frame. The color conversion operation 202 may also produce metadata indicating the conversion operation that was performed and on which portions of the sequence, frame or image it was performed. Instead of merely identifying the transformation, the metadata may include the matrix coefficients that represent the inverse of the color transformation operation applied by block 202. Instead of the metadata including the inverse coefficients, it is contemplated that it may include the coefficients that were used in the color volume conversion operation 202 and that the inverse coefficients may be generated in the decoder 220. The color conversion operation 202 may produce data in a color space that is easier to process by the first transfer function 204.

The transfer function 204 may be a gamma function that compresses bright and/or dark pixel values into a smaller range of values. Alternatively, it may be a perceptual transfer function, such as a perceptual quantization (PQ) transfer function. As another alternative, it may be an identity function that does not result in any transformation of the color converted video data. This function can be applied only to the luminance channel, Y, or to each channel (e.g. Y, Cb, Cr) and different functions may be applied to different portions of a video sequence and/or different frames or portions of frames in the sequence. For example, a gamma or PQ transfer function applied to the luminance channel in a relatively dark area of an image, may result in a related operation (e.g. a cross-channel offset and scaling operation) being applied to the chrominance channel data in that image area. Block 204 also generates metadata describing the inverse of the transform that was applied and the portion of the image data to which it was applied. This metadata may include parameters that describe the inverse transfer function as a linear quadratic, cubic or higher order equation. The complete transfer function may be generated from these values, for example, using linear, quadratic, cubic or higher-order spline curve fitting operation, to specify a respective set of coefficient values for a linear, quadratic or cubic equation that model each segment of the inverse transfer function. Using these methods, the transfer function may be specified as a sequence of pivot points and coefficient sets for linear, quadratic, cubic or higher-order equations for a function that joins each successive pair of pivot points.

The color converted and transformed data from block 204 is then subject to a final color conversion operation in block 206. This color conversion operation may, for example, convert the video data to a color space such as I'PT or Y'CbCr that is more suitable for perceptual compression, especially for WCG image data. Block 206 may convert a sequence of images, single images, or portions of images into one or more color spaces that are easier to process for perceptual normalization and quantization. As with block 202, the color conversion performed by block 206 may be the identity function, resulting in no conversion. Alternatively, different color transformation operations may be performed on different portions of the video data. Furthermore, block 206 can generate metadata describing the color conversion that was performed and the portions of video data (supra-picture, pictures or sub-pictures) to which it was applied. This metadata may simply identify the portion of the data and the conversion that was applied. Alternatively, instead of identifying the conversion, the metadata may include the coefficients of the 3×3 conversion matrix. As described above, the metadata may describe the color conversion that was performed by block 206 or its inverse. In this example block 206 converts the video data to the YCbCr color space.

After block 206, the twice color converted video data is subject to a second transfer function 208. Function 208 may be a reshaping transfer function that prepares the video data to be encoded at a lower bit-depth by effectively assigning more quantization steps to video information that will be perceived as important by the human visual system and assigning fewer quantization steps to video information that will be perceived as unimportant. Transfer function 208 may be a function that conforms the data to human perception, for example, a Stevens' power law or Weber law transfer function with a gamma component that can be selected based on image content, intended maximum and minimum sample values, maximum brightness or luminance contrast and/or quantization step size in the portion of the video data to be processed. Block 208 may include multiple transfer functions, one of which is selected for a particular video data set. Transfer function 208 may adjust the image to account for contrast sensitivity of the luminance pixels and remap the corresponding chrominance samples based on the transformation applied to the luminance samples. This function may be applied to the video data set which may include a sequence of frames, a single frame or a portion of a frame, such as a processing window. As with the other blocks in the preprocessing stage, the reshaping transfer function block 208 can generate metadata describing the transfer function that was applied, or its inverse, and the frames or portions of frames to which it was applied. This metadata may describe the transfer function parametrically or by a sequence of values. Parameters for the transfer function to be applied may be determined by analyzing the video data provided to the transfer function.

In one implementation, multiple inverse transfer functions may be defined corresponding to multiple transfer functions applied to various decoded data sets. Information describing the multiple inverse transfer functions may be signaled in the image data at a relatively high level (e.g. the image essence, sequence or GOP level) and a particular one of the multiple inverse transfer functions may be selected to be applied to a particular data set (e.g. image, slice, or sub-image processing window). Alternatively, both the transfer function(s) and the indication of the data sets to which the transfer function(s) is/are applied may be signaled at a sub-picture level, for example, using an SEI message.

The video data may be divided into processing windows, for example, by applying a quad tree decomposition to the image data so that the data in each leaf has a characteristic value (e.g. maximum and minimum sample values, maximum brightness or luminance contrast and/or quantization step size). Alternatively, the quad-tree algorithm may divide the image such that a predetermined percentage (e.g. 80-95%) of the image data in each leaf of the quad tree has data values within a predetermined range or ranges. In another alternative, the processing windows can be specified as regions to which tone mappings are applied to achieve a desired subjective target such as determined by a colorist. The region shape can be rectangular, circular, etc. where parameters of the shape, location, size, etc. can be specified. When identifying a processing window, it may be desirable to determine the maximum, average, and minimum values of each video component video data in the processing window and to supply these values to the transfer function block 208. For example, the system may determine the minimum, average and maximum values by performing a histogram on the processing window that divides the image pixels into bins and selecting a set of contiguous bins that span some percentage (e.g. 80-95%) of the pixels in the processing window. The minimum data value may be the minimum value defined by the bin containing the smallest data values, the maximum data value may be the maximum value defined by the bin containing the largest data values, and the average value may be the mean or median of all values in all of the selected bins. Block 208 then adapts the reshaping transfer function and/or perceptual normalizer 210 (e.g. selects a particular one of the predefined transfer functions) to increase the number of quantization steps assigned between the minimum and maximum values while decreasing the number of quantization steps assigned to values less than the minimum and/or greater than the maximum. The adaptation is noted in the metadata which also includes data identifying the processing window. This metadata is sent to the decoder with the data stream so that inverse perceptual normalization and inverse reshaping transfer functions may be applied to the data decoded from the data stream. The metadata may include data from which the multiple inverse transfer functions may be retrieved as well as parameters describing the selected transfer function to be applied to a particular data set so that the selected inverse transfer function may be reconstituted as a look-up table (LUT).

While the identification of processing windows is described as being performed by the reshaping transfer function block 208, it is contemplated that it may be performed by other elements of the decoder. For example it may be performed by the video source 102 (shown in FIG. 1) or by the intermediate color conversion block 202. In addition to dividing individual frames into processing windows, the same algorithm may be used to group frames in the digital video data by their common characteristics, and/or to identify characteristics of individual frames. It may be advantageous to identify portions of the digital video data having common characteristics early in the encoding process so that both of the color conversion processes and the compression transfer function process may be tailored to the same portions.

After the reshaping transfer function 208 or as a part of the transfer function, the video data set may be subject to perceptual normalization at block 210. This step adjusts the gain (scaling) and offset of the video data to make the perceptual compression of the video data more uniform across the group of frames and/or frame. Perceptual normalization may also perform cross-channel processing to compensate the chrominance samples for processing performed on the corresponding luminance samples. The gain and offset values or their inverses, as well as an identification of the portions of the image data to which they were applied, are provided as metadata. Perceptual normalization may not be used when the transfer functions 204 and 208 produce uniformly perceptually transformed data or when it is not important for the video data to be uniformly perceptually transformed.

In this example, which uses a Main 10 HEVC encoder, the normalized perceptually compressed data provided by the transfer function 208 and/or optional perceptual normalization process 210 are quantized to 10-bit values in the quantizer 212. If the output samples of the transfer function 208 and/or perceptual normalizer 210 are floating-point values, quantizer 212 may convert the pixel samples from floating-point to 10 bit fixed point values. If output samples are N-bit fixed-point values (N>10) the quantizer may select the 10 most significant bits (MSBs) of the N-bit samples or round these values based on the $11^{th}$ bit. Because of the preprocessing performed by blocks 202, 204, 206, 208 and 210, more perceptually significant image data receives a greater number of quantization levels than less perceptually significant data. It is contemplated that the quantizer 212 may employ scalar or vector quantization for the color components.

Next, block 214 down-samples the chrominance information to convert the 4:4:4 pixels into 4:2:0 pixels. The reduction of resolution of the chrominance samples is less noticeable to the human visual system which perceives colors at lower spatial resolution than luminance. Metadata defining the processing performed to down-sample the chrominance information is added to the metadata from the down-sampling block 214 of the encoder. This metadata, for example, may describe the kernel of a two-dimensional spatial filter that was used to generate the down-sampled data or an inverse filter that generates spatially up-sampled data from the down-sampled data. The metadata may also specify any phase shift offsets in the subsampling operations. The encoder 216 then encodes the pre-processed, quantized and down-sampled data to produce an output data stream. In one implementation, the metadata is encoded with the data stream as a supplemental enhancement information (SEI) message or as a video usability information (VUI) message. Although block 214 is shown as converting 4:4:4 pixels to 4:2:0 pixels, it is contemplated that other conversions could be performed, for example converting the 4:4:4 pixels to 4:2:2 or 4:1:1 pixel formats. If any of these alternate down-sampled formats is generated by block 214, corresponding up-sampling would be performed by the corresponding block in the decoding system.

The decoding system 220 shown in FIG. 2B receives the data stream at decoder 222. The example Main 10 HEVC decoder 222, extracts the metadata, and reverses the encoding operation performed by the encoder 216 to produce 10-bit video data in a 4:2:0 pixel format. The metadata produced by the chrominance down-sampler 214 is applied to an up-sampler 224 that reconstructs 4:4:4 pixel format samples from the 4:2:0 samples, for example by applying the 4:2:0 samples to a spatial interpolation filter. These samples are provided to an inverse quantizer 226 that convert the 4:4:4 pixel samples to floating point values or may add zero-valued more significant bits to fixed-point samples. The operations performed by the inverse quantizer 226 tend to reverse the quantization operations performed by the quantizer 212.

Block 228, based on the metadata received from the perceptual normalization block 210, performs complementary gain and offset operations to reverse the gain and offset adjustments performed by the perceptual normalization filter 210. Similarly, block 230 applies a transfer function that is the inverse of the reshaping transfer function 208. This may be an inverse Stevens' law or an inverse Weber law transfer function generated from parameters in the metadata or it may be a transfer function regenerated from values in the metadata that represent either samples of the applied filter characteristic or line segments of a linearized or higher order characteristic. As described above, multiple inverse transfer functions may have been specified at a sequence or GOP level and one of these transfer functions may be signaled for the video data set (e.g. frame or sub-frame), depending on the content of the video data set.

Similarly, blocks 232, 234 and 236 of decoder 220 respectively may invert the final color conversion operation performed by block 206, the first transfer function performed by block 204 and the intermediate color conversion operation performed by block 202 of the encoder 200. These operations are performed only on the data sets representing the regions of the frame or frames associated with the color conversion operations and transfer functions as indicated by the metadata. The output data provided by the inverse color conversion block 236 is a reconstructed linear HDR and/or WCG RGB signal. Perceptually important data such as detail and texture in dark portions of the images and color values in both the dark and bright portions of the images are preserved in the reconstructed data while less perceptually important data may be lost. Although the systems shown in FIGS. 2A and 2B as well as the systems shown in FIGS. 3A and 3B below are shown as receiving and reconstructing linear HDR RGB data, it is contemplated that they may receive and reconstruct other HDR and/or WCG data.

FIGS. 3A and 3B describe a variant of the encoding and decoding systems shown in FIGS. 2A and 2B. Many of the blocks shown in FIGS. 3A and 3B are the same as the blocks in FIGS. 2A and 2B that have the same numbers. For the sake of brevity, the operation of these blocks is not separately described herein. One difference between FIGS. 2A and 2B on the one hand and FIGS. 3A and 3B on the other hand is the perceptual reshaping block 304 and the corresponding inverse perceptual reshaping block 327 shown in FIG. 3B. Block 304 combines the reshaping transfer function 306 with the perceptual normalization operation 308 and, similarly, block 327 combines the inverse perceptual normalization operation 326 and the inverse reshaping transfer function block 328.

Other differences between the systems 200 and 220 shown in FIGS. 2A and 2B relative to the respective systems 300 and 320 shown in FIGS. 3A and 3B are the locations of the chrominance down-sampling process 302 and the chrominance up-sampling process 330 in the processing stream. In FIG. 3A the down-sampling process 302 operates on the data provided by the final color conversion process 206. Similarly, in FIG. 3B, the up-sampled output values provided by the up-sampling process 330 are applied to the inverse color conversion process 232, which is the inverse of the process 206. The relocation of the down-sampling and up-sampling processes results in the perceptual reshaping processing being performed on pixels having down-sampled chrominance values. This modification may result in less processing as fewer chrominance samples are processed by blocks 306, 308, 310 shown in FIG. 3A and blocks 324, 326 and 328 shown in FIG. 3B than are processed by the corresponding blocks 208, 210 and 212 shown in FIG. 2A and blocks 226, 228 and 230 shown in FIG. 2B. As described above, further processing reduction may be achieved by including the offset and gain adjustments performed by the perceptual normalization process 308 with the reshaping transfer function 306 and including the inverse offset and gain adjustments performed by the inverse perceptual normalization process 326 with the inverse reshaping transfer function 328. Thus, the encoder and decoder system shown in FIGS. 3A and 3B may be more efficient than the encoder and decoder shown in FIGS. 2A and 2B.

In one example, the output of inverse rescaling can be computed as f(x)—or based on f(x)—given the input color component x (e.g. Y, Cb, Cr). For a piecewise function with N segments, the N functions $f_i(x)$, $0 <= i < N$, can be defined so that $$f(x) = \beta_{(x)}, \text{ for } x_i \le x < x_{i+1} \qquad (1)$$

In one implementation, the N+1 segment boundary points $x_i$, referred to herein as pivots, as well as parameters for the piecewise functions can be signaled. If $f_i(x)$ is a polynomial having an order of $M_i$ the metadata describing the polynomial includes $M_i+1$ parameters. Based on the values signaled, a LUT corresponding to the inverse reshaping transfer function can be reconstructed at the decoding system 150. A different LUT can be used for each color component, and an indication of which LUT is to be used for the reshaping for a given color component in a given image or sub-image processing window can also be signaled in the metadata. To reduce the amount of metadata used to signal the multiple (L) inverse reshaping transfer functions, the corresponding piecewise functions for L LUTs may be signaled in a self-referential metadata structure containing the metadata sent from the encoding system 100 to the decoding system 150.

Figure 4:
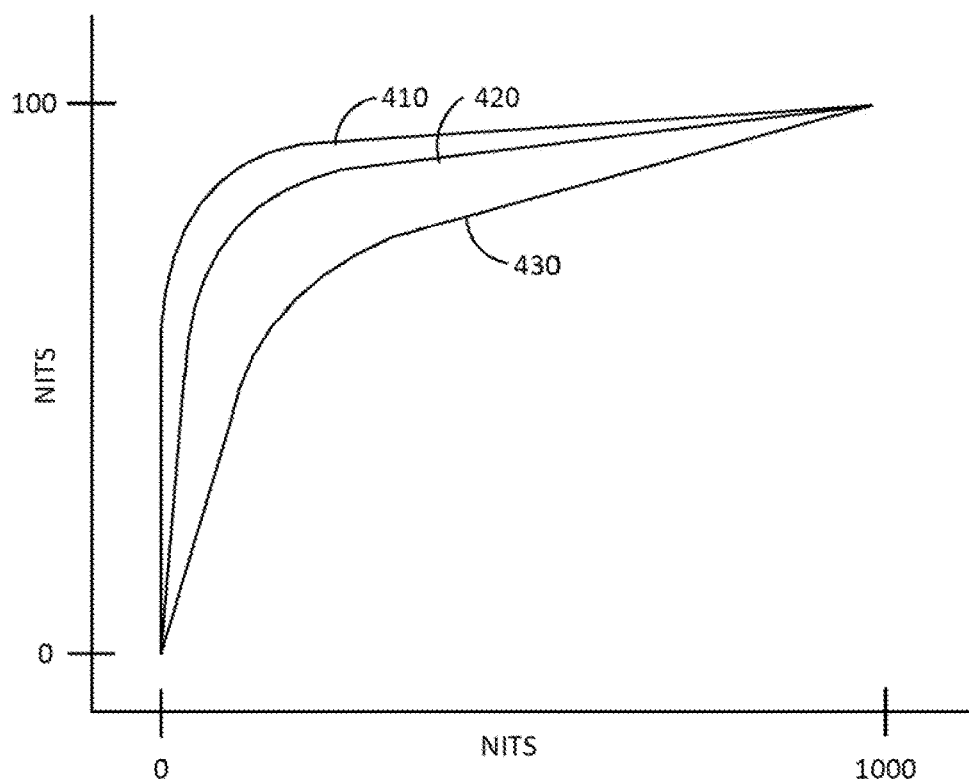
FIG. 4 is a graph showing example reshaping transfer functions that may be applied by the encoders shown in FIGS. 2A and 3A.
Figure 5:
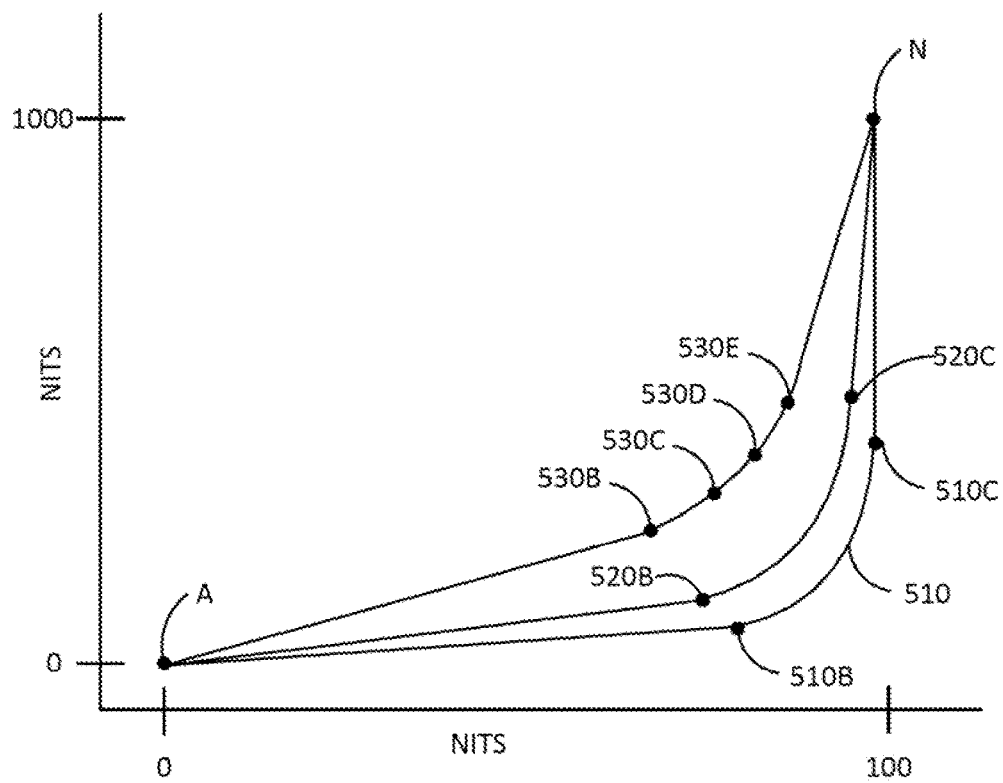
FIG. 5 is a graph showing example inverse reshaping transfer functions that may be applied by the decoders shown in FIGS. 2B and 3B.

FIGS. 4 and 5 show example reshaping transfer functions and inverse transfer functions, respectively. The functions 410, 420 and 430 shown in FIG. 4 are gamma reshaping transfer functions having respectively different gamma values and the functions 510, 520 and 530 shown in FIG. 5 are corresponding inverse gamma transfer functions. The inverse transfer function 510 is divided into three segments, defined by four pivot points. The initial pivot point, A, and final pivot point, N, are common for all three transfer functions. Function 510 has two pivot points, 510B and 510C in addition to pivot points A and N. It is noted that the segment between pivot points A and 510B is approximately linear (e.g. has a quadratic coefficient that is less than 5% of its linear coefficient). The segment between points 510B and 510C exhibits a curve and, thus, may have significant quadratic and cubic coefficients. The segment between the pivot point 510C and pivot point N is also approximately linear.

The transfer function defined by curve 520 is similar to that defined by 510 in that the segment between points A and 520B is approximately linear, the segment between points 520B and 520C is curved and the segment between points 520C and N is approximately linear. Curve 530 shows a transfer function having a larger number of pivot points, in this case, six: A, 530B, 530C, 530D, 530E, and N. The segments between points A and 530B on the one hand and points 530E an N on the other hand are both approximately linear. Transfer function 530 has three curved segments defined by the four pivot points 530B, 530C, 530D and 530E.

The materials that follow present example syntaxes that define how the transfer functions are represented in the metadata sent from the encoding system 100 to the decoding system 150 (shown in FIG. 1).

In an example syntax in TABLEs 1-5 it is proposed that a number of reshape transfer functions, NumLutReshape, may be signaled in the metadata, and an index value, lut_reshape_index[c], may be used to select the inverse reshaping function for the color component c of a particular video data set. Thus, the metadata defining the NumLutReshape LUTs (shown in TABLEs 1-3) may be included in metadata at a relatively high level (e.g. in the sequence parameter set (SPS)) while metadata specifying the reshaping_id of a specific LUT to use for a color component of a video data set (shown in TABLEs 4 and 5) may be in the metadata at a lower level (e.g. in the picture parameter set (PPS)). The materials that follow concern metadata used in the inverse reshaping operation in the decoder 150. Thus, for the sake of simplicity, the inverse reshaping operations described here may be referred to as simply reshaping operations.

The examples described below relate to the concept of using a video coding scheme for encoding and decoding of video sequences having a high dynamic range (HDR) and/or wide color gamut (WCG). More specifically, they describe the processing and reconstruction of video data obtained from an encoder or decoder process. Examples of an encoder or decoder process are MPEG-4 Advanced Video Coding (AVC) and High Efficiency Video Coding (HEVC). In an example, pre-processing and post-processing is used in an encoding and decoding reshaping process of HDR video for better coding efficiency and visual quality, and an efficient signaling of reshaping parameters is proposed. In another example, HDR adaptation information is signaled through SEI messages.

The material below presents example syntax and text modifications relative to the HEVC standard (Recommendation ITU-T H.265∥International Standard ISO/IEC 23008-2, HEVC version 2, October 2014) (hereinafter "the HEVC Standard") which is incorporated herein by reference. These modifications provide for reshaping and HDR adaptation processes for HDR video. The syntax defines a self-referential data structure that may be used to transmit metadata describing reshaping transfer functions in an H.265 video signal so that HDR/WCG video data may be reconstructed from video data decoder from the H.265 video signal.

In one example, the reshaping and HDR adaptation process is applied after HEVC Main 10 decoding. Depending on the choice of parameters, the decoding process can generate both HDR and SDR versions for output display and viewing.

The syntax below can be extended to accommodate additional reshaping processes. For example, different values of reshaping_mode[c], where c indicates a color component, can be used for the different reshaping processes. In addition to the nearest neighbor collocated sample, other neighborhood values and filtered values can be used.

In other examples, signaling of the syntax elements can be done in VPS, SPS, PPS, etc. For the fixed point computations, other bit depth precisions, rounding, truncation, intermediate operations, etc. can be used.

The syntax shown in TABLE 1 modifies the HEVC Standard to replace part of the General Sequence Parameter Set (SPS) raw byte sequence payload (RBSP) syntax specified in section 7.3.2.2.1 of the HEVC Standard. The ellipses indicate unchanged portions of the General Sequence Parameter Set of the HEVC Standard that are not referenced in the materials below and that are omitted for the sake of brevity.

TABLE 1

|  | Descriptor | Line |
|---|---|---|
| seq_parameter_set_rbsp( ) { |  |  |
| ... |  | 1 |
| bit_depth_luma_minus8 | ue(v) | 2 |
| bit_depth_chroma_minus8 | ue(v) | 3 |
| ... |  | 4 |
|   sps_extension_present_flag | u(1) | 5 |
|   if( sps_extension_present_flag ) { |  | 6 |
|     sps_range_extension_flag | u(1) | 7 |
|     sps_multilayer_extension_flag | u(1) | 8 |
|     sps_3d_extension_flag | u(1) | 9 |
|     sps_scc_extension_flag | u(1) | 10 |
|     sps_hdrwcg_extension_flag | u(1) | 11 |
|     sps_extension_3bits | u(3) | 12 |
| } |  | 13 |
|   if( sps_range_extension_flag ) |  | 14 |
|     sps_range_extension( ) |  | 15 |
|   if( sps_multilayer_extension_flag ) |  | 16 |
|     sps_multilayer_extension( ) /* specified in Annex F */ |  | 17 |
|   if( sps_3d_extension_flag ) |  | 18 |
|     sps_3d_extension( ) /* specified in I*/ |  | 19 |
|   if( sps_scc_extension flag ) |  | 20 |
|     sps_scc_extension( ) |  | 21 |
|   if( sps_hdrwcg_extension_flag ) |  | 22 |
|     sps_hdrwcg_extension( ) |  | 23 |
|   if( sps_extension_3bits ) |  | 24 |
|     while( more_rbsp_data( ) ) |  | 25 |
|       sps_extension_data_flag | u(1) | 26 |
|   rbsp_trailing_bits( ) |  | 27 |
| } |  | 28 |

The items at lines 11, 12, 22 and 23 are added to or modified in the syntax of the HEVC Standard. Two new values are defined for the syntax: sps_hdrwcg_extension_flag (line 8) and sps_extension_3 bits (line 11). When, at line 22, sps_hdrwcg_extension_flag is equal to 1, the sps_hdrwcg_extension( ) syntax structure at line 23 is present in the SPS of the RBSP syntax structure. When sps_hdrwcg_extension_flag equal to 0, the sps_hdrwcg_extension( ) syntax structure is not present. When the syntax structure is not present, the value of sps_hdrwcg_extension_flag is inferred to be equal to 0.

When sps_extension_3 bits (line 24) is equal to 0, no sps_extension_data_flag syntax elements are present in the SPS raw byte sequence payload (RBSP) syntax structure. When present, sps_extension_3 bits will be equal to 0 in RBSPs conforming to the modified syntax for the HEVC Standard. Values of sps_extension_3 bits not equal to 0 are reserved for future use by ITU-T|ISO/IEC. Decoders shall allow the value of sps_extension_3 bits to be not equal to 0 and shall ignore all sps_extension_data_flag syntax elements in an SPS NAL unit. When not present, the value of sps_extension_3 bits is inferred to be equal to 0.

The sps_hdrwcg_extension( ) may be defined as shown in TABLE 2, which includes, at line 1, the hdr_reshaping_sps_table ( ) that is defined below in TABLE 3. Both of these structures are added to the HEVC Standard.

TABLE 2

| | Descriptor | Line |
|---|---|---|
| sps_hdrwcg_extension( ) { | | |
|   hdr_reshaping_sps_table( ) | | 1 |
|   reshape_output_luma_bit_depth_increment | ue(v) | 2 |
|   reshape_output_chroma_bit_depth_increment | ue(v) | 3 |
| } | | 4 |

The value reshape_output_luma_bit_depth_increment at line 2 specifies the sample bit depth increment of the output luminance component of the reshaping process relative to the bit depth of the input luminance component (8+bit_depth_luma_minus8) specified in the HEVC Standard. The value of reshape_output_luma_bit_depth_increment has a range from 0 to 8. The bit depth of the output luminance samples, BitDepthReshapeOutputLuma, is derived as follows:

$$BitDepthReshapeOutputLuma = bit\_depth\_luma\_minus8 + 8 + reshape\_output\_luma\_bit\_depth\_increment$$

Similarly, the value reshape_output_chroma_bit_depth_increment at line 3 specifies the sample bit depth increment of the output chrominance component of the reshaping process relative to the bit depth of the input chrominance component (8+bit_depth_chroma_minus8). The value of reshape_output_chroma_bit_depth_increment has a range from 0 to 8. The bit depth of the output chrominance samples, BitDepthReshapeOutputChroma, is derived as follows:

$$BitDepthReshapeOutputChroma = bit\_depth\_chroma\_minus8 + 8 + reshape\_output\_chroma\_bit\_depth\_increment$$

TABLE 3 provides the syntax for the hdr_reshaping_sps_table ( ) shown at line 1 of TABLE 2.

TABLE 3

| | Descriptor | Line |
|---|---|---|
| hdr_reshaping_sps_table( ) { | | |
|   reshape_present_flag | u(1) | 1 |
|   if( reshape_present_flag ) { | | 2 |
|     num_lut_reshape_greater1_flag | u(1) | 3 |
|     if (num_lut_reshape_greater1_flag ) | | 4 |
|       num_lut_reshape_minus2 | u(4) | 5 |
|     for( k = 0; k < NumLutReshape; k++ ) { | | 6 |
|       reshape_num_pivots_minus2[k ] | u(3) | 7 |
|       for( i = 0; i < reshape_num_pivots_minus2[ k ] + 2; i++ ) { | | 8 |
|         reshape_coded_pivot_value[ k ][ i ] | u(10) | 9 |
|       } | | 10 |
|       for( i = 0; i < reshape_num_pivots_minus2[ k ] + 1; i++ ) { | | 11 |
|         smoothness_degree[ k ][ i ] | ue(v) | 12 |
|         poly_degree_of_freedom_minus1[ k ][ i ] | ue(v) | 13 |
|         for( j = 0; j < poly_degree_of_freedom_minus1[ k ][ i ] + i; j++ ) { | | 14 |
|           poly_free_coef[ k ][ i ][ j ] | se(v) | 15 |
|       } | | 16 |

TABLE 3-continued

| | Descriptor | Line |
|---|---|---|
|     } | | 17 |
|    } | | 18 |
|   } | | 19 |
| } | | 20 |

When reshape_present_flag (line 1) is equal to 1, syntax elements for reshaping parameters are present. When reshape_present_flag is equal to 0 syntax elements for reshaping parameters are not present and there is no reshaping operation. When not present the value of reshape_present_flag is inferred to be equal to 0.

When num_lut_reshape_greater1-flag (line 3) is equal to 0, there is only one reshaping LUT function. When num_lut_reshape_greater1_flag is equal to 1, multiple reshaping LUT functions are defined in the sequence parameter set (SPS). When not present, the value of num_lut_reshape_greater1_flag is inferred to be equal to 0.

If multiple reshaping functions exist, the number of such functions is given by 2+num_lut_reshape_minus2 (line 5). In this example, the value of num_lut_reshape_minus2 has a range from 0 to 15. Each reshaping function defines a look-up-table (LUT). The number of reshape LUTs, NumLutReshape, is derived as follows:

NumLutReshape=num_lut_reshape_greater1_flag*
    (num_lut_reshape_minus2+1)+1

In the syntax of TABLE 3, the variable k is used to specify a particular reshaping function (LUT). Each function is divided into segments and each segment is modeled by an equation. The value 2+reshape_num_pivots_minus2[k] (line 7) specifies the number of pivot values in the $k^{th}$ piecewise segmented function. In this example, the value of reshape_num_pivots_minus2[k] has a range from 0 to 7.

Also in TABLE 3, the variable i is used to specify a particular reshape_coded_pivot_value[k][i] (line 9). This value is the $i^{th}$ pivot value for the $k^{th}$ LUT. Each pivot point except the last pivot point has a distinct reshaping transfer function. In this example, the value of reshape_coded_pivot_value[k][i] ranges between 0 and 1023.

The value smoothness_degree[k][i] (line 12) specifies the smoothness condition for the polynomial function of segment i of reshaping transfer function k. In this implementation, the value of smoothness_degree[k][i] has a range between 0 and 3. This value specifies constraints on the set of coefficients. A value of 0 indicates no constraints. A value of 1 indicates that the segments defining the transfer function are contiguous—the starting endpoint of one segment is the same as the ending point of the previous segment. A value of 2 indicates that the slope of the transfer function at the pivot point is the same for both the current and previous segments. As described below, the smoothness_degree value limits the number of coefficients that are provided for every pivot point except the first pivot point.

The value 1+poly_degree_of_freedom_minus1[k][i] (line 13) specifies the number of coefficients signaled for the polynomial function of pivot point (segment) i of table k. In this example, the value of poly_degree_of_freedom_minus1[k][i] has a range between 0 and (3−smoothness_degree[k][i]). Thus, the combination of smoothness_degree[k][i] and poly_degree_of_freedom_minus1[k][i] determine the number of coefficients that are specified for transfer function k. The value 1+poly_degree_of_freedom_minus1 specifies the order of the equation used to model the transfer function between the current pivot point and the next pivot point. Because coefficient values of a constrained segment may be inferred from the equation describing the previous segment, the number of coefficients in a coefficient set may be reduced. For example, for a segment having a smoothness degree of 1 and an order of 2, the coefficient set includes only two coefficients as the first coefficient is inferred from the end point of the equation defining the previous segment. Similarly, a segment having a smoothness degree of 2 and an order of 2 has only one coefficient in its coefficient set.

The value poly_free_coef[k][i][j] (line 15) specifies the polynomial coefficient j for the polynomial function of segment i of reshaping transfer function k. The value of poly_coef[k][i][j] has a range from $-2^{21}$ to $2^{21}-1$), inclusive.

TABLES 1, 2 and 3 define a self-referential data structure (i.e. a metadata structure) that may be used to signal metadata describing reshaping transfer functions which may be used to recover the HDR/WCG video data from the decoded HEVC video data. These TABLEs define metadata that is transmitted at the sequence level.

TABLE 4 defines modifications to the General Picture Parameter Set (PPS) of the RBSP syntax of the HEVC Standard. As with the General Sequence Parameter Set, described above, the ellipsis indicates unchanged portions of the syntax that are not referenced below. These portions have been deleted for the sake of brevity.

TABLE 4

| | Descriptor | Line |
|---|---|---|
| pic_parameter_set_rbsp( ) { | | |
|    ... | ... | 1 |
|   pps_extension_present_flag | u(1) | 2 |
|   if( pps_extension_present_flag ) { | | 3 |
|     pps_range_extension_flag | u(1) | 4 |
|     pps_multilayer_extension_flag | u(1) | 5 |
|     pps_3d_extension_flag | u(1) | 6 |
|     pps_scc_extension_flag | u(1) | 7 |
|     pps_hdrwcg_extension_flag | u(1) | 8 |
|     pps_extension_3bits | u(3) | 9 |
|   } | | 10 |
|   if( pps_range_extension_flag ) | | 11 |
|     pps_range_extension( ) | | 12 |

TABLE 4-continued

|  | Descriptor | Line |
|---|---|---|
| if( pps_multilayer_extension_flag ) | | 13 |
|   pps_multilayer_extension( ) /* specified in Annex F */ | | 14 |
| if( pps_3d_extension_flag ) | | 15 |
|   pps_3d_extension( ) /* specified in Annex I */ | | 16 |
| if( pps_scc_extension_flag ) | | 17 |
|   pps_scc_extension( ) | | 18 |
| if( pps_hdrwcg_extension_flag ) | | 19 |
|   pps_hdrwcg_extension( ) | | 20 |
| if( pps_extension_3bits) | | 21 |
|   while( more_rbsp_data( ) ) | | 22 |
|     pps_extension_data_flag | u(1) | 23 |
| rbsp_trailing_bits( ) | | 24 |
| } | | 25 |

The items in lines 8, 9, 19 and 20 are added to or modified in the syntax of the HEVC Standard. When pps_hdrwcg_extension_flag (line 8) is equal to 1 (line 19), the pps_hdrwcg_extension( ) syntax structure (line 20) is present in the PPS of the RBSP syntax structure. When pps_hdrwcg_extension_flag is equal to 0, the pps_hdrwcg_extension( ) syntax structure is not present and there is no reshaping operation. If reshape_present_flag equal to 0, pps_hdrwcg_extension_flag cannot be set to 1. When not present, the value of pps_hdrwcg_extension_flag is inferred to be equal to 0.

When pps_extension_3 bits (line 9) is equal to 0, no pps_extension_data_flag syntax elements are present in the PPS RBSP syntax structure. When present, pps_extension_3 bits will be equal to 0 in RBSPs conforming to the HEVC Standard. Values of pps_extension_3 bits not equal to 0 are reserved for future use by ITU-T|ISO/IEC. Decoders shall allow the value of pps_extension_3 bits to be not equal to 0 and shall ignore all sps_extension_data_flag syntax elements in an PPS NAL unit. When not present, the value of pps_extension_3 bits is inferred to be equal to 0. One example syntax of pps_hdrwcg_extension( ), suitable for the HEVC Standard is defined by TABLE 5.

Two modes are described in detail below. In the first mode, each color component is associated with a respective transfer function. The second mode uses a cross-channel function, in this case, a cross luminance function so that, each chrominance data set is modified by the luminance transfer function with an input offset and an output offset for the particular chrominance component. It is contemplated that other modes may be implemented, for example a cross-channel function that uses the transfer function for Cb to determine the sample values for Cr. Each of these other modes may be represented by a distinct value of reshaping_mode[c].

The value lut_offset_1[c] (line 9) specifies an input offset value for the reshaping process. The value of lut_offset_1[c] has a range of $-2^{(reshape\_input\_c\_bit\_depth\_minus8+8)}$ to $2^{(reshape\_input\_c\_bit\_depth\_minus8+8)}-1$, inclusive. In the syntax, a left shift operation is represented by the symbol "<<" and a right shift operation is represented by the symbol ">>". Thus, the value $2^{(reshape\_input\_c\_bit\_depth\_minus8+8)}$ may also be represented as 1<<(reshape_input_c_bit_depth_minus8+8). In this example, each chrominance data value is summed with the offset value before being applied to the luminance LUT.

TABLE 5

|  | Descriptor | Line |
|---|---|---|
| pps_hdrwcg_extension( ) { | | |
|   if(reshape_present flag ) { | | 1 |
|     for( c = 0; c < 3; c++ ) { | | 2 |
|       if (num_lut_reshape_greater1_flag ) { | | 3 |
|         lut_reshape_index[ c ] | u(4) | 4 |
|       } | | 5 |
|       reshaping_mode[ c ] | u(4) | 6 |
|       if (reshaping_mode[ c ] > 0) { | | 7 |
|         lut_offset_1[ c ] | se(v) u(16) | 8 |
|         lut_offset_2[ c ] | se(v) u(16) | 9 |
|       } | | 10 |
|     } | | 11 |
|   } | | 12 |
| } | | 13 |

The value lut_reshape_index[c] (line 4) specifies the index of reshaping table that defines the reshaping transfer function for the color component c (e.g. Y, Cb or Cr). When not present, the value of lut_reshape_index[c] is inferred to be equal to 0. The value of lut_reshape_index[c] shall be less than or equal to num_lut_reshape_minus2+1.

The value reshaping_mode[c] (line 7) specifies how the LUT for the $k^{th}$ reshaping transfer function is indexed and used in the reshaping process. In one implementation, the value of reshaping_mode[c] has a range between 0 and 15.

The value lut_offset_2[c] (line 10) specifies an output offset value for the reshaping process. The value of lut_offset_2[c] has a range of $-2^{(reshape\_output\_c\_bit\_depth\_minus8+8)}$ to $2^{(reshape\_output\_c\_bit\_depth\_minus8+8)}-1$, inclusive. In this example, the output value of the LUT for each chrominance value is summed with the output offset value for that chrominance component.

The syntax described by TABLEs 1-5 defines a self-referential data structure for the HEVC Standard that is used to send metadata defining one or more reshaping transfer functions from an encoding system, such as the system 100 in FIG. 1 to a decoding system, such as the system 150 shown in FIG. 1. When the decoding system receives the metadata, it generates the LUT(s) that describe the inverse transfer function(s) and reconstructs the HDR/WCG data from the decoded HEVC data. The following is a description of the HDR/WCG reconstruction process which includes an HDR reshaping process that applies the decoded data to the generated LUT(s).

As defined by the HEVC Standard, the decoded video data may include both luminance and chrominance components. The format of these components is specified by a value ChromaArrayType. When only luminance samples are present, i.e. a monochrome image, ChromaArrayType is 0, when the samples are in 4:2:0 format ChromaArrayType is 1, when they are in 4:2:2 format when ChromaArrayType is 2, and when they are in 4:4:4 format, ChromaArrayType is 3. The HDR reshaping process is invoked with the reconstructed luminance picture sample array $S_L$ and, when ChromaArrayType is not equal to 0, the chrominance picture sample arrays $S_{Cb}$ and $S_{Cr}$ as inputs, and the modified reconstructed picture sample array $S'_L$ and, when ChromaArrayType is not equal to 0, the arrays $S'_{Cb}$ and $S'_{Cr}$ after HDR reshaping as outputs.

Inputs to reshaping process are the reconstructed luminance picture sample array recPicture$_L$ and, when ChromaArrayType is not equal to 0, the arrays recPicture$_{Cb}$ and recPicture$_{Cr}$. The input bit depth is specified by BitDepthReshapeInput Outputs of this process are the modified reconstructed picture sample array after HDR reshaping process reshapePicture$_L$ and, when ChromaArrayType is not equal to 0, the arrays reshapePicture$_{Cb}$ and reshapePicture$_{Cr}$. The output bit depth is specified by BitDepthReshapeOutput. The value ChromaArrayType is defined in the HEVC Standard.

The sample values in the modified reconstructed picture sample array reshapePicture$_L$ and, when ChromaArrayType is not equal to 0, the arrays reshapePicture$_{Cb}$ and reshapePicture$_{Cr}$ are initially set equal to the sample values in the reconstructed picture sample array recPicture$_L$ and, when ChromaArrayType is not equal to 0, the arrays recPicture$_{Cb}$ and recPicture$_{Cr}$, respectively.

The reshaped luminance sample reshapePicture$_L$[xP][yP] with xP ranging between 0 and PicWidthInSamplesY−1 and yP ranging between 0 and PicHeightInSamplesY−1 is derived by invoking the HDR reshaping process for the luminance sample values as specified below with luminance sample location (xP, yP) and sample array recPictureL as inputs. The values PicWidthInSamplesY and PicHeightInSamplesY are defined in the HEVC Standard.

Similarly, the reshaped chrominance sample reshapePictureCb[xC][yC] with xC ranging between 0 and PicWidthInSamplesC−1 and yC ranging between 0 and PicHeightInSamplesC−1 is derived by invoking the HDR reshaping process of chrominance sample values as specified below with chrominance sample location (xC, yC) and sample array recPictureCb as inputs. The values PicWidthInSamplesC and PicHeightInSamplesC are defined in the HEVC Standard.

The reshaped chrominance samples for the Cr signal, reshapePictureCr[xC][yC] with xC ranging from 0 to PicWidthInSamplesC−1 and yC ranging from 0 to PicHeightInSamplesC−1 are derived in the same way as the Cb samples.

The HDR reshaping process used in one embodiment is described below. Inputs to this process are a luminance or chrominance location (xP, yP) specifying the luminance or chrominance sample location for component c relative to the top-left luminance or chrominance sample of the current picture and a luminance or chrominance sample at the specified location.

The outputs of this process is a HDR reshaped luminance or chrominance sample value reshapeSample. The value of reshapeSample is derived for each of the color components, c (Y=0, Cb=1 and Cr=2), by applying the following ordered steps:

If c is equal to 0, BitDepthReshapeOutput is set equal to BitDepthReshapeOutputLuma and BitDepthReshapeInput is set equal to (8+bit_depth_luma_minus8), and reshape_output_bit_depth_increment is set equal to reshape_output_luma_bit_depth_increment.

If c is not equal to 0, BitDepthReshapeOutput is set equal to BitDepthReshapeOutputChroma and BitDepthReshapeInput is set equal to (8+bit_depth_chroma_minus8), and reshape_output_bit_depth_increment is set equal to reshape_output_chroma_bit_depth_increment.

If reshape_present_flag is equal to 0 or pps_hdrwcg_extension_flag is equal to 0, reshapeSample is set equal to recPicture[xP][yP]<<reshape_output_bit_depth_increment for component c (i.e. recPicture[xP][yP] is shifted to the left by reshape_output_bit_depth_increment bit positions).

If reshape_present_flag is not equal to 0 and pps_hdrwcg_extension_flag is not equal to 0 then, if reshaping_mode[c] is equal to 0, reshapeSample is derived by applying the following ordered steps:

A) The value of the reshaping table index, LutIndx, is then set equal to lut_reshape_index[c].
B) The variable idx is derived by invoking the identification of piece-wise function index as specified below in TABLE 6 with the input of sample value recPicture[xP][yP] for component c using reshaping look-up table indicated by LutIndx.
C) PolyOrder[LutIndx][idx] is set to poly_degree_of_freedom_minus1[LutIndx][idx]+smoothness_degree[LutIndx][idx].
D) The values of PolyCoef[LutIndx][idx][j] for the coefficients of the segment idx for the polynomial reshaping table LutIndx are specified as follows:
  The values of PolyCoef[LutIndx][idx][j] are set equal to 0 for j=0 to 3.
  If smoothness_degree[LutIndx][idx] is equal to 0, then PolyCoef[LutIndx][idx][j] is set equal to poly_free_coef[LutIndx][idx][j] for j ranging between 0 and PolyOrder[LutIndx][idx].
  If smoothness_degree[LutIndx][idx] is greater than 0, then PolyCoef[LutIndx][idx][j] is derived by invoking the derivation of polynomial coefficients process as specified in TABLE 7 below.
E) The value of reshapeSample is derived as follows:

recPictureClip=Clip3(reshape_coded_pivot_value
  [LutIndx][0],reshape_coded_pivot_value
  [LutIndx][reshape_num_pivots_minus2+1],
  recPicture[*xP*][*yP*]), where $$\text{Clip3}(x, y, z) = \begin{cases} x & \text{for } z < x \\ y & \text{for } z > y \\ z & \text{otherwise} \end{cases}$$

F) recPictureClipOffset=recPictureClip−reshape_coded_pivot_value[LutIndx][idx]

G) reshapeSample=((PolyCoef[LutIndx][idx][0]<<BitDepthReshapeInput)+(PolyCoef[LutIndx][idx][1]*recPictureClipOffset)+(((PolyCoef[LutIndx][idx][2]*recPictureClipOffset)>>BitDepthReshapeInput)*recPictureClipOffset)+((((PolyCoef[LutIndx][idx][3]*recPictureClipOffset)>>BitDepthReshapeInput)*recPictureClipOffset)>>BitDepthReshapeInput)*recPictureClipOffset)>>(17−reshape_output_bit_depth_increment)

Otherwise, if reshaping_mode[c] is greater than 0, reshapeSample is derived by applying the following ordered steps:

A) The value of the reshaping table index LutIndx is set equal to lut_reshape_index[c].
B) If ChromaArrayType is equal to zero, the variable idx is derived by invoking the identification of piece-wise function index as specified in TABLE 6 below with the input of sample value recPicture[xP][yP] for component c using the reshaping table identified by LutIndx.
C) If ChromaArrayType is not equal to zero, the variable idx is derived as follows:
  The value of recPictureLuma is set equal to the input luminance sample value recPicture[2*xP][2*yP] for luminance component c=0.
  The variable idx is derived by invoking the identification of piece-wise function index as specified in TABLE 6 below with the input of sample value recPictureLuma for luminance component c=0 using reshaping table LutIndx.

D) The value of the PolyOrder[LutIndx][idx] is set to poly_degree_of_freedom_minus1[LutIndx][idx]+smoothness_degree[LutIndx][idx]
E) The values of PolyCoef[LutIndx][idx][j] for the coefficients of the segment idx for the polynomial reshaping table LutIndx are specified as follows:
  The values of PolyCoef[LutIndx][idx][j] are set equal to 0 for j=0 to 3.
  If smoothness_degree[LutIndx][idx] is equal to 0, PolyCoef[LutIndx][idx][j] is set equal to poly_free_coef[LutIndx][idx][j] for j=0 to PolyOrder[LutIndx][idx].
  Otherwise (smoothness_degree[LutIndx][idx] is greater than 0), PolyCoef[LutIndx][idx][j] is derived by invoking the derivation of polynomial coefficients process as specified in TABLE 7 below.
F) The value of reshapeSample is derived as follows:

recPictureLumaClip=Clip3(reshape_coded_pivot_value[LutIndx][0],reshape_coded_pivot_value[LutIndx][reshape_num_pivots_minus2+1],recPictureLuma)

G) recPictureLumaClipOffset=recPictureLumaClip−reshape_coded_pivot_value[LutIndx][idx]

H) reshapeSample=((PolyCoef[LutIndx][idx][0]<<BitDepthReshapeInput)+(PolyCoef[LutIndx][idx][1]*recPictureClipOffset)+(((PolyCoef[LutIndx][idx][2]*recPictureClipOffset)>>BitDepthReshapeInput)*recPictureClipOffset)+((((PolyCoef[LutIndx][idx][3]*recPictureClipOffset)>>BitDepthReshapeInput)*recPictureClipOffset)>>BitDepthReshapeInput)>>BitDepthReshapeInput I) reshapeSample=(reshapeSample*(recPicture[xP][yP]+lut_offset1[c])−lut_offset2[c])>>(17−reshape_output_bit_depth_increment)

As described above, a part of the generation of the reshape sample value is the identification of piecewise function index for a transfer function. An example process is described by the computer code in TABLE 6. The input to this process is a sample value S for table index k and the output is an index idxS of piecewise function. If the value S is less than the first pivot point S is set to the first pivot point. If S is greater than the next-to-last pivot point S is set to the next-to-last pivot point. idxS is then incremented from 0 to the number of pivots−1 and S is compared to the next pivot value. When S is less than the next pivot value (identified by IdxS) and greater than the current pivot value (identified by idxS+1) then the value for idxS has been found. If the loop terminates before idxS has been found, idxS is set to the index of the next-to-last pivot point.

TABLE 6

```
if( ( S < reshape_coded_pivot_value[ k ][ 0 ] )
    S = reshape_coded_pivot_value[ k ][ 0 ]
else if( S > reshape_coded_pivot_value[ k ][reshape_num _pivots_minus2 + 1 ] )
    S = reshape_coded_pivot_value[ k ][ reshape_num_pivots_minus2 + 1]
for( idxS = 0, idxFound = 0; idxS < reshape_num_pivots_minus2 + 1; idxS++ ) {
    if( S < reshape_coded_pivot_value[ k ][idxS + 1] ) {
        idxFound = 1
        break
    }
}
if ( ! idxFound)
    idxS = idxS − 1
```

The following is a description of an example process for deriving the polynomial coefficients using the metadata described above. The inputs to this process are table index k and polynomial segment index i and the output of this process are the polynomial coefficients PolyCoef[k][i][j] for j=0 to PolyOrder[k][i]. The example process for deriving the coefficients is shown in TABLE 7: For the first segment (i=0), all coefficients are specified in the syntax. For smoothness degree 0, all coefficients are specified for subsequent segments. For smoothness degree equal to 1, the first (offset) coefficient is not specified because the starting point of the current segment is limited to be the ending point of the previous segment (i.e. the value of the previous segment at the pivot point). For smoothness degree equal to 2, neither the first (offset) nor the second (slope) coefficients are specified because the slope of the current segment of the transfer function is limited to be the slope at the pivot point of the previous segment of the transfer function.

TABLE 7

```
If (i = = 0){
  If smoothness_degree[ k ][ 0 ] is equal to 0,
    for (j=0; j<=PolyOrder[ k ][ 0 ]; ++j)
      PolyCoef[ k ][ 0 ][ j ] = poly_free_coef[ k ][ 0 ][ j ]
  else {
    idx = smoothness_degree[ k ][ 0 ]
    for (j = 0; j <= PolyOrder[ k ][ 0 ]; ++j ) {
      if (j < smoothness_degree[ k ][ 0 ] )
        PolyCoef[ k ][ 0 ][ j ] = 0
      else
        PolyCoef[ k ][ 0 ][ j ] = poly_free_coef[ k ][ 0 ][ j − idx ]
      }
    }
  }
}
else {
  idx = (i − 1).
  If smoothness_degree[ k ][ idx ] is = 0
    for (j=0; j<=PolyOrder[ k ][ 0 ]; ++j)
      PolyCoef[ k ][ idx ][ j ] = poly_free_coef[ k ][ idx ][ j ]
  else{
    idx = smoothness_degree[ k ][ i ]
    for ( j = 0; j <= PolyOrder[ k ][ i ]; ++j ) {
      if ( j < idx ) {
        if ( j= = 0 )
        PolyCoef[ k ][ i ][ j ] = (PolyCoef[ k ][ i − 1 ][ j <<
          BitDepthReshapeInput+PolyCoef[k][i−1]
          [j+1]*(reshape_coded_pivot_value[k ][i−1])+((PolyCoef[k][i−1]
          [j+2]* (reshape_coded_pivot_value[k ][i]-
          reshape_coded_pivot_value[k ][i−1]
          ))>>BitDepthReshapeInput)
          *(reshape_coded_pivot_value[k ][i]-
          reshape_coded_pivot_value[k ][i−1]) +(((PolyCoef[k][i−1]
          [j+3]* (reshape_coded_pivot_value[k ][i]-
          reshape_coded_pivot_value[k ][i−1]
          ))>>BitDepthReshapeInput)
          *(reshape_coded_pivot_value[k ][i]-
          reshape_coded_pivot_value[k ][i−1]))
          >>BitDepthReshapeInput)*(reshape_coded_pivot_value[k]
          [i]-reshape_coded_pivot_value[k ][i−1])) >>
          BitdepthReshapeInput
        else if ( j = = 1)
        PolyCoef[ k ][ i ][ j ] = ( PolyCoef[ k ][ i − 1 ][ j ]
          <<BitDepthReshapeInput+2*PolyCoef[k][i−1]
          [j+1]*(reshape_coded_pivot_value[k ][i]-
          reshape_coded_pivot_value[k ][i−1]) +((3* PolyCoef[k][i−1]
          [j+2]* (reshape_coded_pivot_value[k ][i]-
          reshape_coded_pivot_value[k ][i−1]
          ))>>BitDepthReshapeInput)
          *(reshape_coded_pivot_value[k ][i]-
          reshape_coded_pivot_value[k ][i−1])) >>
          BitdepthReshapeInput
        else
        PolyCoef[ k ][ i ][ j ] = ( PolyCoef[ k ][ i − 1 ][ j ]
          <<BitDepthReshapeInput + 3 * PolyCoef[ k ][i−1]
          [j+1]*(reshape_coded_pivot_value[k ][i]-
          reshape_coded_pivot_value[k ][i−1])) >>
          BitDepthReshapeInput
        }
      else
        PolyCoef[ k ][ i ][ j ] = poly_free_coef[ k ][ i ][ j − idx ]
      }
   }
}
```

The materials above describe generating the reshaped sample values "on the fly" by applying the decoded sample values to equations reconstructed from the metadata structure. It is contemplated, however, that the equations describing each segment of each transfer function may be extracted and used to generate data that is stored in one or more look-up tables (LUTs). This data may be generated, for example, by pre-computing each value of the equation and storing the computed value in a cell addressed by the input sample value. In this implementation, the decoded sample values would be applied as address inputs to the LUT corresponding to the LutIndex associated with the segment to generate the reshaped sample values.

As an alternative to signaling metadata defining piecewise transfer functions in a self-referential data structure in the SPS or PPS, the transfer functions may be signaled in one or more supplemental enhancement information (SEI) messages of an RBSP. As with the examples The example syntax shown in TABLE 8 specifies one of several predetermined transfer functions to be applied. The transfer functions shown in this TABLE are known by the decoder and signaled in the SEI message. The identified transfer function may be modified by parameter values in the SEI message as well as by scale and offset values. The example SEI message applies to the video data set until it is canceled by a subsequent SEI message or as described below based on the setting of the persistence flag. As with the piecewise functions described above, these transfer functions may be applied in a post-processing step after the HEVC video data has been decoded.

TABLE 8

|  | Descriptor | Line |
|---|---|---|
| hdr_adaptation ( payloadSize ) { | | |
|   hadp_id | ue(v) | 1 |
|   hadp_cancel_flag | u(1) | 2 |
|   if( !hadp_cancel_flag ) { | | 3 |
|     hadp_persistence_flag | u(1) | 4 |
|     hadp_full_range | u(1) | 5 |
|     atf_present_flag | u(1) | 6 |
|     if( atf_present_flag ){ | | 7 |
|       atf_id | u(2) | 8 |
|       for( i=0; i<NumberOfAtfParameters; i++ ) | | 9 |
|       atf_param[i] | u(32) | 10 |
|     } | | 11 |
|     for( c=0; c <= 2; c++ ) { | | 12 |
|       range_adaptation_present_flag | u(1) | 13 |
|       If ( range_adaptation_present_flag ) { | u(1) | 14 |
|         scale[ c ] | u(16) | 15 |
|         offset [ c ] | i(16) | 16 |
|       } | | 17 |
|     } | | 18 |
|   } | | 19 |
| } | | 20 |

The values in the syntax are defined as follows.

hadp_id (line 1) contains an identifying number that may be used to identify the purpose of the hdr adaptation information SEI messages. The value of hadp_id has a range of from 0 to $2^{32}-2$, inclusive.

hadp_cancel_flag (line 1) indicates whether the hdr adaptation information SEI message cancels the persistence of any previous hdr adaptation SEI message in output order that applies to the current layer (hadp_cancel_flag equal to 1). When hadp_cancel_flag is equal to 0, hdr adaptation information follows. If hadp_cancel_flag is 1, none of the syntax elements in lines 4-16 are included in the SEI message.

hadp_persistence_flag (line 4) specifies the persistence of the hdr adaptation information SEI message for the current layer. hadp_persistence_flag equal to 0 specifies that the hdr adaptation information that applies to the current layer. When hadp_persistence_flag is equal to 1, the adaptation information persists until either condition A or B is true. These conditions assume that picA is the current picture.

A) A new coded layer-wise video sequence (CLVS) of the current layer begins.

B) A picture picB in the current layer in an access unit containing an hdr adaptation information SEI message with the same value of hadp_id and applicable to the current layer is output for which PicOrderCnt(picB) is greater than PicOrderCnt(picA), where PicOrderCnt (picB) and PicOrderCnt(picA) are the picture order count values (PicOrderCntVal) of picB and picA, respectively, immediately after the invocation of the decoding process for picture order count for picB. Picture order count values (PicOrderCntVal) are used to identify pictures, for deriving motion parameters in merge mode and motion vector prediction, and for decoder conformance checking.

hadp_full_range (line 5) specifies the black level and range of the input component signals to HDR adaptation process. hadp_full_range equal to 0 specifies the sample range to be standard range, while hadp_full_range equals to 1 specifies the sample range to be full range. When the video_full_range_flag syntax element is not present, the value of video_full_range_flag is inferred to be equal to 0. In standard range, the range of values defining the white and black levels is less than the full range that would be achieved if all values were used. For example, in an 8 bit system, full range would black-level equals 0 and white level equals 255. In standard range, however, black level equals 16 and white level equals 235.

atf_present_flag (line 6) equal to 1 indicates that adaptive transfer functions will be applied to the input signal for each component. atf_present_flag equal to 0 indicates that atf_id, atf_para1 and atf_para2 are not present in the RBSP and atf_id will be inferred to be 0 (the transfer characteristics are unspecified or are determined by the application). The use of this flag allows the parameters to be provided only when they are needed, reducing the amount of data in the SEI message.

atf_id (line 8) specifies the opto-electronic transfer characteristic of the source picture as specified in Table 9 as a function of a linear optical intensity input Lc with a nominal real-valued range of 0 to 1.

atf_param[i] (line 10) specifies the value of parameters for transfer function which is identified by atf_id.

scale[c] (line 15) specifies the scale value for component c. The value of scale[c] shall be in the range of 0 to 65535, inclusive. When scale[c] is not present, it is inferred to be 256.

offset[c] (line 16) specifies the the offset value for component c. The value of offset[c] shall be in the range of −32768 to 32767, inclusive. When offset[c] is not present, it is inferred to be 0.

range_adaptation_present_flag (line 13) equal to 1 indicates the syntax elements scale [c] (line 15) and offset [c] (line 16) are signaled in this hdr adaptation information. When the value range_adaptation_present_flag is equal to 0, that scale[c] and offset [c] are not present in the RBSP. The examples of the application of values scale[c] and offset[c] are shown in the transfer functions as described below in TABLE 9.

TABLE 9 provides a non-exclusive example of transfer functions that may be signaled using the SEI message syntax described above with reference to TABLE 8. Information about the transfer functions is provided in the Informative Remarks column. While these four transfer characteristics are shown, it is contemplated that other transfer characteristics may be used as long as they are known to the decoding system.

TABLE 9

| atf_id | Transfer Characteristic | Informative Remarks |
| --- | --- | --- |
| 0 | Unspecified | Image characteristics are unknown or are determined by the application. |
| 1 | $V = [(L_C \cdot C)^\gamma - 1]/(C^\gamma - 1)$ for $L_c >= C^{-1}/[(1 - \gamma)^{1/\gamma}]$<br>$V = L_C \cdot \gamma \cdot C/[(C^\gamma - 1) \cdot (1 - \gamma)^{(1-1/\gamma)}]$ for $L_c <= C^{-1}/(1 - \gamma)^{1/\gamma}]$<br>$C$ = atf_para1<br>$\gamma$ = atf_para2 | Adaptive form of the following recommendations Rec. ITU-R BT.709-5 Rec. ITU-R BT. 1361 conventional colour gamut system (functionally the same as the values 6, 14, and 15) |
| 2 | $V = ((c_1 + c_2 * L_c^n) \div (1 + c_3 * L_c^n))^m$ for all values of $L_c$<br>$c_1 = c_3 - c_2 + 1 = 3424 \div 4096 = 0.8359375$<br>$c_2 = 32 * 2413 \div 4096 = 18.8515625$<br>$c_3 = 32 * 2392 \div 4096 = 18.6875$<br>$m = 128 *$ atf_para1 $\div 4096$<br>$n = 0.25 *$ atf_para2 $\div 4096$<br>for which $L_c$ equal to 1 for peak white is ordinarily intended to correspond to a display luminance level of 10 000 candelas per square metre | Society of Motion Picture and Television Engineers ST 2084 for 10, 12, 14, and 16-bit systems. |
| 3 | $V = \mathrm{Log10}(C \cdot L_c + 1)/\mathrm{Log10}(C + 1)$ for $1 >= L_c >= 0$<br>$C$ = atf_para1 | Adaptive Weber Law |

As an alternative to using an SEI message to specify a known transfer function with dynamic parameters, the SEI message may be used to signal a metadata structure that defines one or more segmented transfer functions. TABLE 10 is a first example syntax that may be used to signal such a metadata structure.

TABLE 10

| | Descriptor | Line |
| --- | --- | --- |
| hdr_reshaping( payloadSize ) { | | |
|   reshape_output_luma_bit_depth_increment | ue(v) | 1 |
|   reshape_output_chroma_bit_depth_increment | ue(v) | 2 |
|   reshape_present_flag | u(1) | 3 |
|   if( reshape_present_flag ) { | | 4 |
|     num_lut_reshape_greater1_flag | u(1) | 5 |
|     if (num_lut_reshape_greater1_flag ) | | 6 |
|       num_lut_reshape_minus2 | u(4) | 7 |
|     for( k = 0; k < NumLutReshape; k++ ) { | | 8 |
|       reshape_num_pivots_minus2[k ] | u(3) | 9 |
|       for( i = 0; i < reshape_num_pivots_minus2[ k ] + 2; i++ ) { | | 10 |
|         reshape_coded_pivot_value[ k ][ i ] | u(10) | 11 |
|       } | | 12 |
|       for( i = 0; i < reshape_num_pivots_minus2[ k ] + 1; i++ ) { | | 13 |
|         smoothness_degree[ k ][ i ] | ue(v) | 14 |
|         poly_degree_of_freedom_minus1[ k ][ i ] | ue(v) | 15 |
|         for( j = 0; j < poly_degree_of_freedom_minus1[ k ][ i ] + i; j++ ) { | | 16 |
|           poly_free_coef[ k ][ i ][ j ] | se(v) | 17 |
|         } | | 18 |
|       } | | 19 |
|     } | | 20 |
|     for( c = 0; c < 3; c++ ) { | | 21 |
|       if (num_lut_reshape_greater1_flag ) | | 22 |
|         lut_reshape_index[ c ] | u(4) | 23 |
|       } | | 24 |
|       reshaping_mode[ c ] | u(4) | 25 |
|       if (reshaping_mode[ c ] > 0) { | | 26 |
|         lut_offset_1[ c ] | se(v) | 27 |
|         lut_offset_2[ c ] | se(v) | 28 |
|       } | | 29 |
|     } | | 30 |
|   } | | 31 |
| } | | 32 |

This syntax uses the same parameters that are used to signal the segmented transfer functions in the SPS and PPS data structures. Note that the SEI syntax can also be modified to use persistence and cancel flag syntax similar to that used in TABLE 8. For the sake of brevity, description of the parameters in TABLE 10 is omitted.

Another SEI syntax example is shown in TABLE 11.

TABLE 11

|  | Descriptor | Line |
|---|---|---|
| hdr_reshaping( payloadSize ) { |  |  |
|   reshape_output_luma_bit_depth_increment | ue(v) | 1 |
|   reshape_output_chroma_bit_depth_increment | ue(v) | 2 |
|   reshape_present_flag | u(1) | 3 |
|   if( reshape_present_flag ) { |  | 4 |
|     num_lut_reshape_greater1_flag | u(1) | 5 |
|     if (num_lut_reshape_greater1_flag ) |  | 6 |
|       num_lut_reshape_minus2 | u(1) | 7 |
|     for( k = 0; k < NumLutReshape; k++ ) { |  | 8 |
|       reshape_num_pivots_minus2[k ] | u(3) | 9 |
|       for( i = 0; i < reshape_num_pivots_minus2[ k ] + 2; i++ ) { |  | 10 |
|         reshape_coded_pivot_value[ k ][ i ] | u(10) | 11 |
|       } |  | 12 |
|       for( i = 0; i < reshape_num_pivots_minus2[ k ] + 1; i++ ) { |  | 13 |
|         smoothness_degree[ k ][ i ] | ue(v) | 14 |
|         poly_degree_of_freedom_minus1[ k ][ i ] | ue(v) | 15 |
|         for( j = 0; j < poly_degree_of_freedom_minus1[ k ][ i ] + i; j++ ) { |  | 16 |
|           poly_free_coef[ k ][ i ][ j ] | se(v) | 17 |
|         } |  | 18 |
|       } |  | 19 |
|     } |  | 20 |
|     for( c = 0; c < 3; c++ ) { |  | 21 |
|       reshaping_mode[ c ] | u(4) | 22 |
|       if (reshaping_mode[ c ] > 0) { |  | 23 |
|         lut_offset_1[ c ] | se(v) | 24 |
|         lut_offset_2[ c ] | se(v) | 25 |
|       } |  | 26 |
|     } |  | 27 |
|   } |  | 28 |
| } |  | 29 |

TABLE 11 differs from TABLE 10 in that the look-up table to use for each of the component data (e.g. Y, Cb, Cr) is inferred based on whether more than one reshape table exists (i.e. num_lut_reshape_greater1_flag is equal to 1) and on the number of reshape tables (i.e. 2+num_lut_reshape_minus2). The values num_lut_reshape_greater1_flag (line 5) and num_lut_reshape_minus2 (line 7) are the same as for the SPS and PPS metadata structures described above and are not described here.

The inference uses a value NumLutReshape, which is derived as follows:

NumLutReshape=num_lut_reshape_greater1_flag*(num_lut_reshape_minus2+1)+1

If NumLutReshape is equal to 1, all luminance and chrominance components will use the same LUT. If NumLutReshape is equal to 2, the luminance component (Y) will use the first LUT and the two chrominance components (e.g. Cb, Cr) will use the second LUT. If NumLutReshape is equal to 3, the luminance component will use the first LUT, the Cb component will use the second LUT and the Cr component will use the third LUT.

As described above with reference to FIGS. 1 through 3B, the decoding system regenerates the inverse reshaping transfer function (block 230 or 328) and perhaps the inverse transfer function (block 234) based on the metadata structure extracted from the received coded data stream (e.g. the RBSP). The regenerated SDR decoded video data samples provided by the decoder 222 or 322 are processed through the transfer function(s) to reproduce the HDR/WCG video data that may be displayed on a HDR/WCG video monitor.

While the examples have been described above in connection with specific devices, apparatus, systems, syntaxes and/or methods, it is to be clearly understood that this description is made only by way of example and not as limitation. Particular embodiments, for example, may be implemented in a non-transitory computer-readable storage medium for use by or in connection with an instruction execution system, apparatus, system, or machine. The computer-readable storage medium contains instructions for controlling a computer system to perform a method or to hold a metadata structure as described by particular embodiments. The instructions, when executed by one or more computer processors, may be operable to perform that which is described in particular embodiments.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims.

Accordingly, the specification and figures are to be regarded in an illustrative rather than a restrictive sense, and all such modifications are intended to be included within the scope of the claims. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for generating High Dynamic Range (HDR) and/or Wide Color Gamut (WCG) video data from an encoded video data stream, the method comprising:
   extracting, by a non-HDR and/or non-WCG video decoder, metadata signaled for a video data set in an encoded video data stream comprising encoded non-HDR and/or non-WCG video data,
   wherein said signaled metadata structure includes at least one reshaping parameter for a video data reshaping transfer function signaled in a supplemental enhancement information message of said encoded video data stream and/or video usability information message of said encoded video data stream,
   wherein said at least one reshaping parameter are relevant to the video data set signaled at a picture level in the encoded video data stream;
   decoding, by the non-HDR and/or non-WCG video decoder, the encoded non-HDR and/or non-WCG video data to produce decoded non-HDR and/or non-WCG video data;
   determining the video data reshaping transfer function based on the extracted metadata structure;
   generating reshaped HDR and/or WCG video data as output data by applying the decoded non-HDR and/or non-WCG video data to the video data reshaping transfer function.

2. The method of claim 1 wherein applying said decoded non-HDR and/or non-WCG video data to the regenerated video data reshaping transfer function is an inverse luma mapping function applied to a luma component and a scaling of chroma components using a luma-dependent scaling function, where said inverse luma mapping and said luma-dependent chroma scaling are based upon said signaled self referential metadata structure in said supplemental enhancement information message of said encoded video data stream and/or said video usability information message of said encoded video stream.

3. The method of claim 1 wherein said encoded video data stream is HEVC compliant.

4. The method of claim 1 wherein said encoded video data stream is AVC compliant.

5. The method of claim 1 wherein said supplemental enhancement information message is included in a NAL unit of said encoded video data stream.

6. The method of claim 1 wherein said video usability information message is included in a sequence parameter set of said encoded video data stream.

7. The method of claim 1 wherein said reshaping function is a perceptual quantizer function.

8. The method of claim 1 wherein said reshaping function is a gamma function.

9. The method of claim 1 wherein said reshaping function includes tone mapping.

10. The method of claim 1, further comprising:
    generating a look-up-table (LUT) for the video data reshaping transfer function by applying values representing a range of decoded video data values to the transfer function and storing output values of the transfer function at locations in the LUT addressed by the applied values; wherein generating the reshaped HDR and/or WCG video data includes applying the decoded video data as address values to the LUT.

11. The method of claim 1, wherein:
    the extracted metadata structure includes data defining a plurality of segments of the transfer function, each segment being specified by first and second pivot points and a set of coefficient values, wherein the coefficient values in the set of coefficients is signaled in the metadata structure and a number of coefficient values in the set varies based on characteristics of the segment; and
    the regenerating of the video data reshaping transfer function includes regenerating respective equations for each segment from the signaled coefficient values for each segment.

12. The method of claim 11, wherein:
    each segment is modeled as one of: a first order function having a two coefficient coefficient set, a second order function having a three coefficient coefficient set, or a third order function having a four coefficient coefficient set.

13. The method of claim 11, wherein:
    the data defining each segment of the plurality of segments further includes a smoothness degree value indicating a number of coefficients for a current segment of the transfer function that are derived from an immediately previous segment of the transfer function; and
    the coefficient sets extracted from the metadata structure for segments having smoothness degree value of 1 and 2 have respectively 1 and 2 fewer coefficient values than coefficient sets for segments modeled by equations having the same order and a smoothness degree of 0.

14. The method of claim 1, wherein the metadata structure includes:
    a first metadata structure associated with a supra-picture element of the data stream the first metadata structure including the data defining the video data reshaping transfer function; and
    a second metadata structure associated with a picture or sub-picture element of the data stream, the second metadata structure defining application of the video data reshaping transfer function to at least one component of the decoded video data.

15. The method of claim 14, wherein:
    the decoded video data includes a luminance component and two chrominance components;
    the first metadata structure includes data defining multiple video data reshaping transfer functions; and
    the second metadata structure includes data identifying one of the multiple video data reshaping transfer functions to apply to each of the luminance component and chrominance components.

16. The method of claim 14, wherein:
    the decoded video data includes a luminance component and two chrominance components;
    the first metadata structure includes data defining one video data reshaping transfer function;
    the second metadata structure includes:

data identifying the one video data reshaping transfer function as being associated with the luminance component and the two chrominance components; and data indicating respective input and output offset values for each chrominance component;

the regenerating of the video data reshaping transfer function uses data extracted from the first metadata structure; and the generating of the reshaped HDR video data for the chrominance components includes applying the decoded chrominance components to the video data reshaping transfer function as modified by input and output offset values extracted from the second metadata structure.

17. The method of claim 14, wherein:

the decoded video data includes a luminance component and two chrominance components;

the first metadata structure includes data defining first and second video data reshaping transfer functions;

the second metadata structure includes:

data identifying the first video data reshaping transfer function as being associated with the luminance component; and data identifying the second video data reshaping transfer function as being associated with at least one of the two chrominance components;

the regenerating of the video data reshaping transfer function uses data extracted from the first metadata structure; and the generating of the reshaped HDR or WCG video data uses data extracted from the second metadata structure to apply the decoded video data of the luminance component to the first video data reshaping transfer function and to apply the decoded video data of the at least one of the two chrominance components to the second video data reshaping transfer function.

18. The method of claim 17, wherein:

the first metadata structure includes data defining a third video data reshaping transfer function;

the second metadata structure includes data identifying the second video data reshaping transfer function as being associated with a first one of the two chrominance components and data identifying the third video data reshaping transfer function as being associated with a second one of the two chrominance components; and the generating of the reshaped HDR or WCG video data uses data extracted from the second metadata structure to apply the decoded video data of the first chrominance component to an LUT generated from the second video data reshaping transfer function and to apply the decoded video data of the second chrominance component to the third video data reshaping transfer function.

19. The method of claim 14, wherein:

the encoded data stream is a H.265 HEVC raw byte sequence payload (RBSP);

the extracting of the metadata includes extracting the first metadata structure from a sequence parameter set (SPS) of the RBSP; and the extracting of the metadata includes extracting the second metadata structure from a picture parameter set (PPS) of the RBSP.

20. The method of claim 14, wherein:

the encoded data stream is an H.265 HEVC raw byte sequence payload (RBSP); and the extracting of the metadata includes extracting the first and second metadata structures from a supplemental enhancement information (SEI) message of the H.265 HEVC RBSP.

21. A method for generating High Dynamic Range (HDR) or Wide Color Gamut (WCG) video data from an encoded video data stream, the method comprising:

extracting a metadata structure signaled for a video data set in the encoded video data stream;

wherein said signaled metadata structure includes at least one reshaping parameter, wherein said at least one reshaping parameter are signaled at a sequence level in the encoded video data stream;

wherein said at least one reshaping parameter is signaled at a picture level in the encoded video data stream;

decoding the encoded video data stream to produce decoded video data;

regenerating the video data reshaping transfer function based on the extracted at least one reshaping parameter;

generating reshaped HDR and/or WCG video data as output data by applying decoded video data to the at least one reshaping parameter;

wherein generating the reshaped HDR and/or WCG video data includes applying the decoded video data to a perceptual quantization function;

wherein the decoded video data includes a luminance component and two chrominance components;

wherein the encoded data stream is an H.265 HEVC raw byte sequence payload (RBSP);

wherein the extracting of the metadata includes extracting the first and second metadata structures from a supplemental enhancement information (SEI) message of the H.265 HEVC RBSP.

* * * * *